US009755545B2

(12) United States Patent
Lei et al.

(10) Patent No.: US 9,755,545 B2
(45) Date of Patent: *Sep. 5, 2017

(54) SYSTEM AND METHOD FOR UNIFIED COMMON MODE VOLTAGE INJECTION

(71) Applicant: General Electric Company, Schenectady, NY (US)

(72) Inventors: Qin Lei, Niskayuna, NY (US); Jie Shen, Unterföhring (DE); Stefan Schroeder, Munich (DE)

(73) Assignee: General Electric Company, Niskayuna, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 14/550,297

(22) Filed: Nov. 21, 2014

(65) Prior Publication Data

US 2016/0149507 A1    May 26, 2016

(51) Int. Cl.
  *H02M 7/487*  (2007.01)
  *H02M 7/483*  (2007.01)
  *H02M 1/12*  (2006.01)

(52) U.S. Cl.
  CPC ........... *H02M 7/487* (2013.01); *H02M 7/483* (2013.01); *H02M 1/12* (2013.01); *H02M 2001/123* (2013.01)

(58) Field of Classification Search
  CPC ...... H02M 27/487; H02M 7/483; H02M 1/12; H02M 2001/123
  See application file for complete search history.

(56) References Cited

U.S. PATENT DOCUMENTS

| 6,031,738 A | 2/2000 | Lipo et al. |
| 7,196,919 B2 | 3/2007 | Fu et al. |
| 7,495,938 B2 | 2/2009 | Wu et al. |
| (Continued) | | |

FOREIGN PATENT DOCUMENTS

| CN | 103051228 A | 4/2013 |
| EP | 2709261 A1 | 3/2014 |
| EP | 2827490 A1 | 1/2015 |

OTHER PUBLICATIONS

Chaturvedi et al., "Carrier-Based Common Mode Voltage Control Techniques in Three-Level Diode-Clamped Inverter", Hindawi Publishing Corporation, Advances in Power Electronics, vol. 2012, Article ID 327157, 13 pages, 2012.

(Continued)

*Primary Examiner* — Fred E Finch, III
*Assistant Examiner* — Rafael O De Leon Domenech
(74) *Attorney, Agent, or Firm* — Nitin N. Joshi

(57) ABSTRACT

A power conversion system includes at least one multi-level power converter and a controller coupled to the at least one multi-level power converter. The controller includes a first CMV injection module and a second CMV injection module. The first CMV injection module generates a first CMV signal for modifying at least one voltage command to achieve a first function in association with operation of the power conversion system. The second CMV injection module generates a second CMV signal based at least in part on a three-level CMV limit either for modifying the at least one voltage command or for further modifying the at least one modified voltage command to achieve a second function in association with operation of the power conversion system.

15 Claims, 13 Drawing Sheets

(56) References Cited

U.S. PATENT DOCUMENTS

| | | |
|---|---|---|
| 7,573,732 B2 | 8/2009 | Teichmann et al. |
| 8,441,820 B2 | 5/2013 | Shen et al. |
| 2011/0141786 A1* | 6/2011 | Shen .................. H02M 7/487 363/131 |
| 2012/0212172 A1* | 8/2012 | Valdez ................ G01R 31/025 318/805 |
| 2013/0128632 A1 | 5/2013 | Yang et al. |
| 2013/0148397 A1 | 6/2013 | Schroeder et al. |
| 2013/0163292 A1 | 6/2013 | Basic et al. |

OTHER PUBLICATIONS

Wang et al., "Multi-Objective Optimization PWM Control for a Back-To-Back Five-Level ANPC Converter", Energy Conversion Congress and Exposition (ECCE), 2012 IEEE, pp. 3514-3519, Sep. 15-20, 2012.

Shen et al., "A Neutral-Point Balancing Controller for a Three-Level Inverter With Full Power-Factor Range and Low Distortion", IEEE Transactions on Industry Applications, vol. 49, No. 1, pp. 138-148, Jan./Feb. 2013.

Tallam et al., "A carrier-based PWM scheme for neutral-point voltage balancing in three-level inverters", 2004 IEEE Applied Power Electronics Conference and Exposition, APEC 04, IEEE, Anaheim, CA, USA, vol. No. 3, pp. 1675-1681, Feb. 22, 2004.

European Search Report and Written Opinion issued in connection with corresponding EP Application No. 15194443.6-1805 dated Jun. 29, 2016.

\* cited by examiner

SYSTEM AND METHOD FOR UNIFIED COMMON MODE VOLTAGE INJECTION

BACKGROUND

Embodiments of the disclosure relate generally to systems and methods of unified common mode voltage injection to achieve multiple functions.

Power converters, particularly multi-level power converters, are increasingly used for performing power conversion in a wide range of applications due to the advantages of high power quality waveform and high voltage capability. For example, multi-level power converters may be used for performing DC-to-AC power conversion to supply single-phase or multi-phase AC voltages to electric motors in vehicles and/or pumps. Multi-level converters may also be used in power generation systems such as wind turbine generators and solar generators for performing DC-to-AC power conversion to supply single-phase or multi-phase AC voltages for power grid transmission and distribution.

Typically, the power converters are designed to regulate or control various characteristic parameters in association with the operation of the power converters to meet certain requirements and/or ensure reliable operations. For example, a neutral point current between at least two DC capacitors on a DC link is controlled to minimize a voltage difference between the two DC capacitors to avoid stressing of the switching devices and/or creation of undesired harmonic signals. The neutral point current balancing is achieved by multiple control strategies, one of which includes injecting a common mode voltage in the multi-level converter to balance the neutral point current. However, different control strategies are applied to determine the common mode voltage for different level converters. For example, a control strategy for a three level converter is different from a control strategy for a seven level converter which results in undesirable costs and computations. In one approach, a unified common mode voltage injection technique may be applied to control the neutral point current in n-level converters. Different local optimum limits corresponding to different level converters may be used during computation of the common mode voltage to balance the neutral point current. And the calculation methods of neutral point current are different for different level converters as well because of different switching functions and different switching states. Such an approach leads to complex computations as computation methods for balancing the neutral point current are different for different level converters as each converter includes different switching functions and switching states.

Hence, there is a need for an improved system and control methodology to address the aforementioned issues.

BRIEF DESCRIPTION

In accordance with one aspect of the present disclosure, a power conversion system is provided. The power conversion system includes at least one multi-level power converter and a controller coupled to the at least one multi-level power converter. The controller includes a first common mode voltage (CMV) injection module and a second CMV injection module. The first CMV injection module is for generating a first CMV signal for modifying at least one voltage command to achieve a first function in association with operation of the power conversion system. The second CMV injection module is for generating a second CMV signal based at least in part on a three-level CMV limit either for modifying the at least one voltage command or for further modifying the at least one modified voltage command to achieve a second function in association with operation of the power conversion system.

In accordance with another aspect of the present disclosure, a method for operating a power conversion system having a multi-level converter and a controller coupled thereto is provided. The method includes: generating a first common mode voltage (CMV) injection signal; using the first CMV signal to modify at least one voltage command to achieve a first function in association with operation of the power conversion system; generating a second CMV signal based at least in part on a three-level CMV limit; and using the second CMV signal either to modify the at least one voltage command or to further modify the at least one modified voltage command to achieve a second control function in association with operation of the power conversion system.

In accordance with another aspect of the present disclosure, another power conversion system is provided. The power conversion system includes a direct current (DC) link, at least one multi-level power converter, and a controller. The DC link includes at least a first DC part and a second DC part defining a neutral point therebetween. The at least one multi-level power converter is coupled to the DC link. The controller is coupled to the at least one multi-level power converter and includes a common mode voltage (CMV) injection module configured for generating a CMV signal for modifying at least one voltage command to balance DC voltages at the first DC part and the second DC part. The CMV injection module provides at least one of a maximum and minimum CMV limit signal for limiting the magnitude of the CMV signal based at least in part on a three-level CMV limit.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
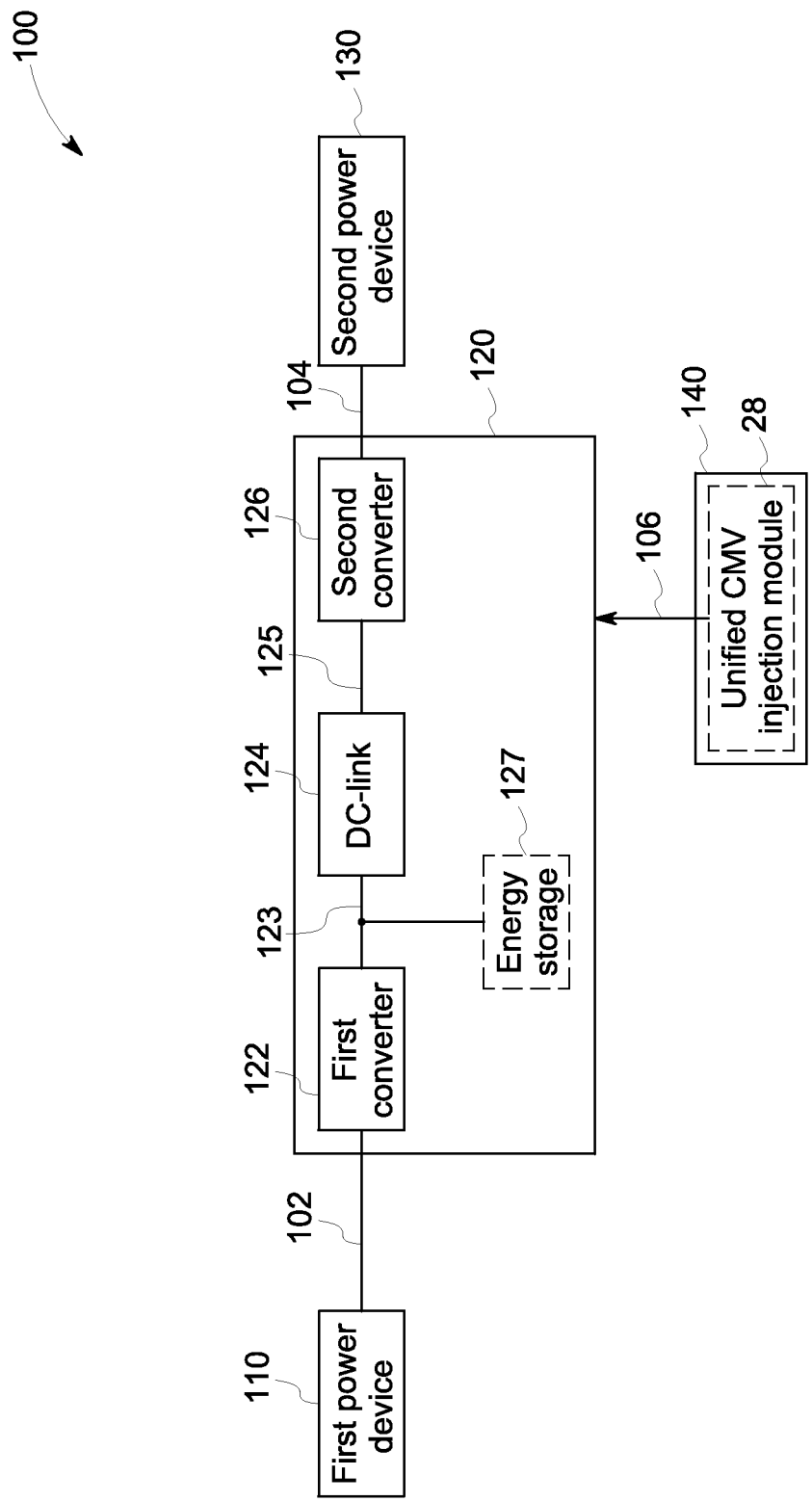
FIG. 1 is a block diagram of a power conversion system configured to implement a unified common mode voltage injection algorithm/method in accordance with an exemplary embodiment of the present disclosure.

Embodiments disclosed herein generally relate to a unified common mode voltage (CMV) injection method and a power conversion system that can be configured to implement the unified CMV injection method to achieve multiple purposes or functions in association with the operation of the power conversion system. More specifically, the unified CMV injection method may be implemented to inject a first CMV signal which is used to modify at least one command signal or modulation signal such as three-phase voltage commands to achieve a first function in association with the operation of the power conversion system. In one embodiment, the first function may be increasing the DC voltage utilization or reducing the total harmonic distortion (THD) which may be achieved by injecting the first CMV signal generated through a min-max calculation. In the min-max calculation, the first CMV signal is generated according to an instantaneous maximum voltage and an instantaneous minimum voltage identified from a plurality of voltage signals such as three-phase voltage signals. In other embodiments, the first CMV signal may be generated by injecting a pure third-order harmonic signal which has a three times fundamental frequency. In some embodiments, to achieve minimum output THD, the first CMV signal may be injected in a particular manner to ensure the modified command signal or the modified modulation signal does not reach the edges of the carrier band. In some embodiments, to further reduce the switching loss in operating the switching devices of the power converter, the first CMV signal may be generated in a particular manner to provide a flattop modulation. Flattop modulation refers to maintaining the gate signals of at least one phase unchanged either at the "0" state or "1" state for a sufficiently long time.

In addition, the unified CMV injection method may be implemented to inject a second CMV signal. This second CMV signal is used to either modify the at least one command or modulation signal prior to the modification by the first CMV signal or to further modify the already modified CMV signal by the first CMV signal to achieve at least a second function in association with the operation of the power conversion system. In some embodiments, the second function may be neutral point current regulation or DC link voltage balancing. More specifically, in one embodiment, the second CMV signal may be injected to regulate a DC current flowing to or from the neutral point at the DC link to make the voltage difference at the DC link substantially zero over one or more control cycles. In another embodiment, the second CMV signal may be injected to regulate an AC current flowing to or from the neutral point at the DC link to make the voltage difference at the DC link substantially zero over one or more control cycles. In some embodiments, the second CMV signal may be injected in a particular manner to ensure the gate signals generated through PWM modulation have a minimal pulse width without creating voltage-second distortion at the output of the power converter. In some embodiments, the second CMV signal is injected to have a minimal magnitude to avoid the creation of undesired THD, but create the same effect of neutral point current regulation or DC voltage balancing.

In some embodiments, during generation of the second CMV signal, a three-level CMV local optimum limit is taken into consideration. The magnitude of the second CMV signal is particularly generated so that one or more modified modulation voltage signals will not exceed a voltage range defined by a maximum modulation voltage limit and minimum modulation voltage limit. Further, the magnitude of the second CMV signal is particularly generated to ensure either the maximum modulation/voltage signal or a minimum modulation/voltage signal modified by the second CMV signal does not cross zero.

Implementing the unified CMV injection method can achieve a variety of technical advantages and/or benefits. One technical advantage or benefit is the DC voltages of the DC link can be balanced at any power factor. Another technical advantage or benefit is the CM voltage seen from the load can be minimized since an average neutral point current instead of an instantaneous neutral point current is compensated, and the capacitor charging/discharging current is not taken in consideration for neutral point current compensation. Yet another technical advantage or benefit in association with injecting CMV signals by considering the three-level CMV limit is avoiding additional switching patterns and/or transients, and reducing control complexity. Other technical advantages or benefits will become apparent to those skilled in the art by referring to the detailed descriptions and accompanying drawings provided below in accordance with one or more embodiments of the present disclosure.

In an effort to provide a concise description of these embodiments, not all features of an actual implementation are described in the one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. Furthermore, the terms "circuit" and "circuitry" and "controller" may include either a single component or a plurality of components, which are either active and/or passive and may be optionally be connected or otherwise coupled together to provide the described function.

FIG. 1 illustrates a block diagram of a power conversion system 100 in accordance with an exemplary embodiment of the present disclosure. The power conversion system 100 may be any appropriate converter-based system that can be configured to implement the unified common mode voltage injection method as disclosed herein. In some embodiments, the power conversion system 100 may be a multi-level converter-based system suitable for high power and high voltage applications. The multi-level power converter may be a three/five/seven-level or N-level neutral point clamped (NPC) converter, a three/five/seven-level or N-level neutral point pilot (NPP) converter, a three/five/seven-level or N-level active neutral point clamped (ANPC) converter, a three/five/seven-level or N-level cascaded H-bridge (Chain-link) converter, or any other type of multi-level converter in which a DC link is composed of one positive rail, one negative rail and one neutral point.

As illustrated in FIG. 1, the power conversion system 100 includes a power conversion device 120 and a control device 140 coupled in communication with the power conversion device 120. In one embodiment, the control device 140 is arranged to be in communication with the power conversion device 120 and may transmit control signals 106 to the power conversion device 120 via one or more electrical links or wires for example. In another embodiment, the control device 140 may be in optical communication with the power conversion device 120 and can transmit the control signals 106 to the power conversion device 120 via an optical communication link, such as one or more optical fibers for example. In another embodiment, the control device 140 may be embedded within the power conversion device 120. The control device 140 may include any suitable programmable circuits or devices such as a digital signal processor (DSP), a field programmable gate array (FPGA), a programmable logic controller (PLC), and an application specific integrated circuit (ASIC). The power conversion device 120 can be operated to perform unidirectional or bidirectional power conversion between a first power device 110 and a second power device 130 in response to the control signals 106 transmitted from the control device 140.

In one embodiment, as shown in FIG. 1, the power conversion device 120 may include a first converter 122, a DC link 124, and a second converter 126. In one embodiment, the first converter 122 may be an AC-DC converter (also known as rectifier) which is configured to convert first electric power 102 (e.g., first AC electric power) provided from the first power device 110 (e.g., power grid) into DC electric power 123 (e.g., DC voltage). In one embodiment, the DC-link 124 may include one or more capacitors coupled in series and/or in parallel. The DC-link 124 is configured to remove ripples from first DC voltage 123 and supply second DC voltage 125 to the second converter 126. In one embodiment, the second converter 126 may be a DC-AC converter (also known as inverter) which is configured to convert the second DC voltage 125 into a second AC voltage 104, and supply the second AC voltage 104 to the second power device 130 (e.g., AC electric motor) or to a power network such as a load and/or utility grid (not shown). Although not illustrated in FIG. 1, in some embodiments, the power conversion system 100 may include one or more other devices and components. For example, one or more filters and/or circuit breakers can be placed between the first power device 110 and the power conversion device 120. Also, one or more filters and/or circuit breakers can be placed between the power conversion device 120 and the second power device 130.

The power conversion system 100 illustrated in FIG. 1 can be used in a variety of applications, for example, in a motor drive for driving motors such as AC motors. The power conversion system 100 can also be used in wind power generation systems, solar/photovoltaic power generation systems, hydropower generation systems, and any combinations thereof. In some other embodiments, the power conversion system 100 may also be used in areas that are desirable to use uninterruptible/uninterrupted power system (UPS) for maintaining continuous power supply. In one embodiment, the first converter 122 may be an AC-DC converter which is configured to convert first AC electric power provided from the first power device 110 (e.g., power grid) into DC electric power. The power conversion system 100 may also include an energy storage device 127 which is configured to receive and store the DC electric power provided from the first converter 122. In one embodiment, the second converter 126 may be a DC-AC converter which is configured to convert the DC electric power provided from the first converter 122 or DC electric power obtained from the energy storage device 127 into second AC electric power, and supply the second AC electric power to the second power device 130 (e.g., a load).

As illustrated in FIG. 1, the control device 140 of the power conversion system 100 may include a unified CMV injection module 28 which can be implemented as software, hardware or a combination thereof to achieve multiple functions in association with the operation of the power conversion system 100. More specifically, the unified CMV injection module 28 can be implemented to inject a first CMV signal which is used to modify one or more command signals or modulation signals such as three-phase AC voltage commands to achieve at least one first function such as increasing DC voltage utilization, reducing total harmonic distortion at the output of the second converter 126, as well as reducing switching loss in association with operating the switching devices in the second converter 126. In addition, the unified CMV injection module 28 may be implemented to inject a second CMV signal which is used to either modify the one or more command signals or modulation signals or further modify the modified one or more command signals or modulation signals to achieve at least one second function such as balancing DC voltages at the DC link 124, limiting minimum pulse width of gating signals, as well as reducing voltage stress at flying capacitors, etc. Detailed description of the unified CMV injection module 28 will be provided below with reference to FIGS. 8-13.

Figure 2:
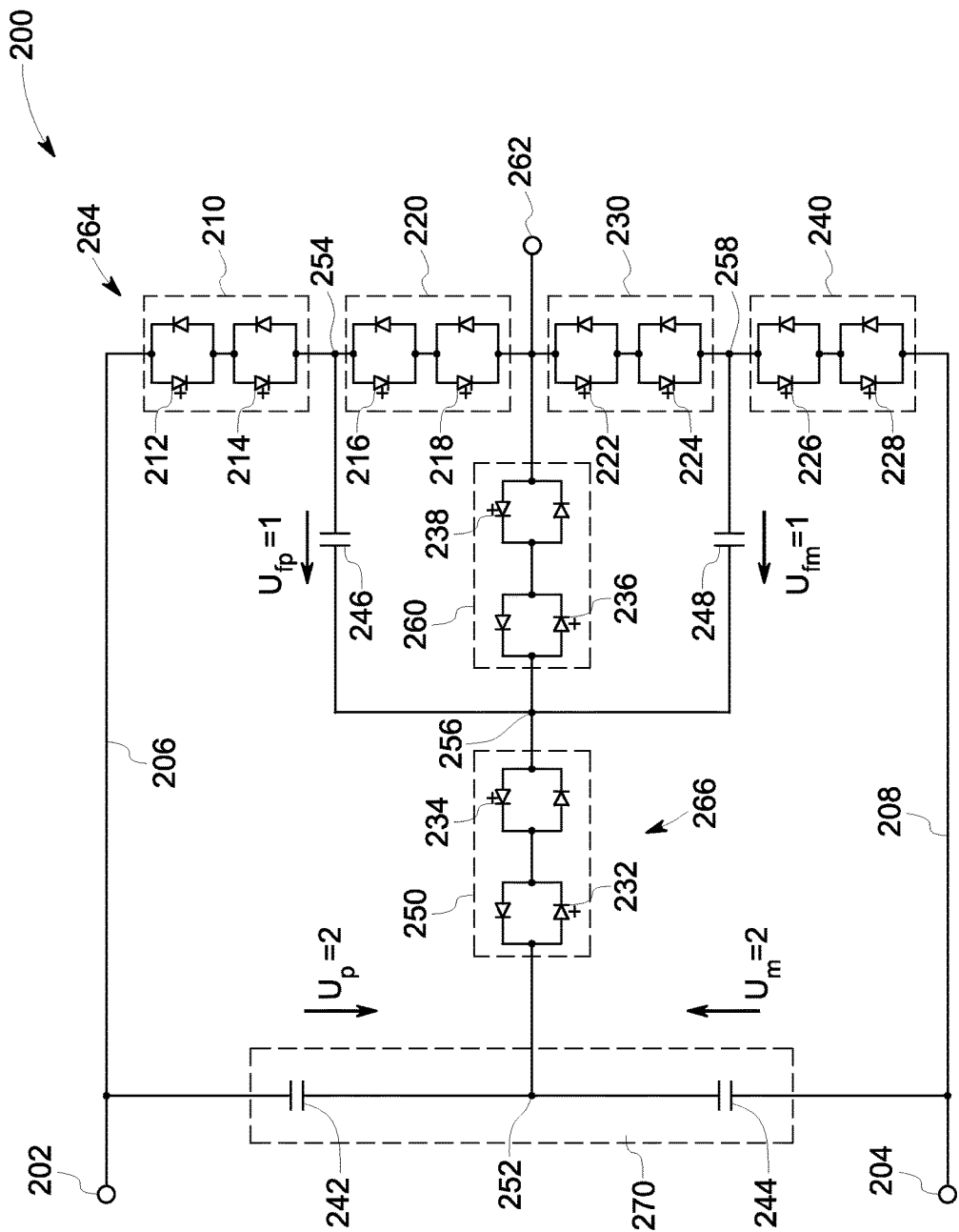
FIG. 2 is a detailed circuit diagram of a converter having a nested neutral point piloted configuration that may be used in the power conversion system shown in FIG. 1 in accordance with an exemplary embodiment of the present disclosure.

FIG. 2 illustrates one potential topology that may be used to implement the unified CMV injection module 28 shown in FIG. 1 to achieve various functions in association with the operation of the power conversion system 100. More specifically, FIG. 2 illustrates a detailed circuit diagram of one phase leg 200 of a three-phase power converter which is particularly arranged to have a nested neutral point piloted (NPP) topology. For a three-phase power converter application, a person skilled in the art will understand that three phase legs 200 may be coupled together to form the three-phase power converter. Furthermore, implementation of the unified CMV injection module is discussed with respect to the three-phase power converter. In a particular configuration, the phase leg 200 is arranged to provide a five-level output. In other embodiments, the phase leg 200 can be arranged in similar manners to provide 2n−1 level output, and n is equal to or greater than three. The phase leg 200 may be implemented as one of the phases for the second power converter or inverter 126 shown in FIG. 1 for converting DC voltages into AC voltages. The phase leg 200 can also be implemented as one phase of the first converter or rectifier 122 shown in FIG. 1 for converting AC voltages into DC voltages.

As illustrated in FIG. 2, the phase leg 200 includes four switch units 210, 220, 230, 240 coupled in series to form a longitudinal arm 264. In the exemplary embodiment, each of the four switch units 210, 220, 230, 240 includes two switching devices connected in a head-to-tail manner such that low-voltage rating semiconductor switching devices can be used to substantially equally share the voltage applied from a positive rail 206 and a negative rail 208. The positive rail 206 and the negative rail 208 are electrically coupled to a first port 202 and a second port 204, respectively, for receiving input voltage from a power source (not shown). More specifically, an emitter terminal of a first switching device 212 is connected to a collector terminal of a second switching device 214. In other embodiments, each of switch units 210, 220, 230, 240 may include any number of series-connected switching devices according to practical requirements.

The phase leg 200 also includes two switch units 250, 260 coupled in series to form a transverse arm 266. Each of the two switch units 250, 260 includes two switching devices connected in series in a head-to-head or back-to-back manner. For example, two switching devices 236, 238 have their emitter terminals connected together, and another two switching devices 232, 234 have their collector terminals connected together. In addition, each of the switching devices 232, 234, 236, 238 in the two switch units 250, 260 can be substituted with more than two series-connected switching devices to allow the use of low-voltage rating switching devices in the transverse arm 266.

Further referring to FIG. 2, the phase leg 200 is coupled to a DC link 270 via the positive rail 206 and the negative rail 208. In the exemplary embodiment, the DC link 270 includes a first capacitor 242 and a second capacitor 244 coupled in series between the positive rail 206 and the negative rail 208. The first and second capacitors 206, 208 are commonly connected to define a neutral point or middle point 252 which is further connected to one terminal of the traverse arm 266. As will be described with more details below, the voltage at the neutral point or middle point 252 can be controlled by implementing the proposed unified CMV injection algorithm/method to at least achieve the function of DC link voltage balancing. The phase leg 200 also includes a first flying capacitor 246 and a second flying capacitor 248. One terminal of the first flying capacitor 246 is connected to a joint connection 254 defined between the first switch unit 210 and the second switch unit 220, and the other terminal of the first flying capacitor 246 is connected to a joint connection 256 defined between the two switch units 250, 260. One terminal of the second flying capacitor 248 is connected to the joint connection 256, and the other terminal of the second flying capacitor 248 is connected to a joint connection 258 defined between the third switch unit 230 and the fourth switch unit 240.

During operation, the plurality of the switching devices in the longitudinal arm 264 and traverse arm 266 can be selectively turned on and off in a predefined switching pattern to provide different levels at the output terminal 262, for example, "2," "1," "0," "−1," "−2," each of which may correspond to a different output voltage level. For example, when the phase leg 200 is desired to provide a "2" level output voltage, the switching devices 212, 214, 216, 218 are turned on, and the switching devices 222, 224, 226, 228, 232, 234, 236, 238 are turned off. Thus, current flows along a path formed by positive rail 206, switching devices 212, 214, 216, 218, and arrives at the output terminal 262. There are two options when the single-phase power converter 200 is desired to provide a "1" level output voltage at the output terminal 262. One option is turning on the switching devices 212, 214, 236, 238, while turning off the switching devices 216, 218, 232, 234, 222, 224, 226, 228. In this case, when a load current is flowing out of node 262, current flows along a path formed by the positive rail 206, the two switching devices 212, 214, the first flying capacitor 246, the switching device 236, an anti-parallel diode in association with the switching device 238, and arrives at the output terminal 262; when the load current is flowing into node 262, current flows along a path formed by the positive rail 206, the anti-parallel diodes in association with the switching device 212, 214, the first flying capacitor 246, the anti-parallel diode in association with the switching device 236, the switching device 238, and the output terminal 262. Another option is turning on the switching devices 216, 218, 232, 234, while turning off the switching devices 212, 214, 222, 224, 226, 228, 236, 238. Thus, when the load current is flowing out of node 262, current can flow along a path formed by the switching device 232, the anti-parallel diode in association with the switching device 234, the first flying capacitor 246, the switching device 216, the switching device 218, and the output terminal 262; when the load current is flowing into node 262, current can flow along a path formed by the anti-parallel diode in association with the switching device 232, the switching device 234, the first flying capacitor 246, the anti-parallel diodes in association with the switching device 216 and 218, and the output terminal 262. The symmetrical switching patterns can be applied for voltage level −1 and −2, and for the second flying capacitor 248. Due to the current path or switching pattern redundancy, the various switching devices of the phase leg 200 can be strategically controlled to charge or discharge the first and second flying capacitors 246, 248 for balancing purposes.

Furthermore, in this embodiment the five-level phase leg 200 can be divided to form two three-level power converters. A first three-level converter 280 may be formed by switch units 220, 230, and 260, whereas a second three-level converter 290 may be formed using switch units 210, 240, and 250. A modulation scheme of the five-level phase leg 200 can be formed by embedding one three-level modulation into another three-level modulation. A pulse width of an equivalent three-level zero state duty cycle associated with the neutral point current, is equal to the pulse width of the real five-level zero state duty cycle and a pulse-width of one of two redundant states for voltage level '1'. Such a pulse-width in five-level converter is exactly the pulse-width duty cycle which is associated with the neutral point current. Therefore, a three-level modulation can be applied to this five-level converter to generate the same average neutral point current. Furthermore, a three-level CMV limit may be applied to the five-level power converter 200 for controlling the neutral point current. Details of the method for controlling the neutral point current and determining the three-level CMV limit are described later in the specification with respect to FIGS. 8-13. Similarly, the same control method may be applied for an n-level power converter. A three-level modulation can be applied to N-level three phase converter for calculating the average neutral point current of the N-level three phase converter and implementing all the balancing algorithm, and the same three-level CMV limit may be applied to balance the neutral point current.

Figure 3:
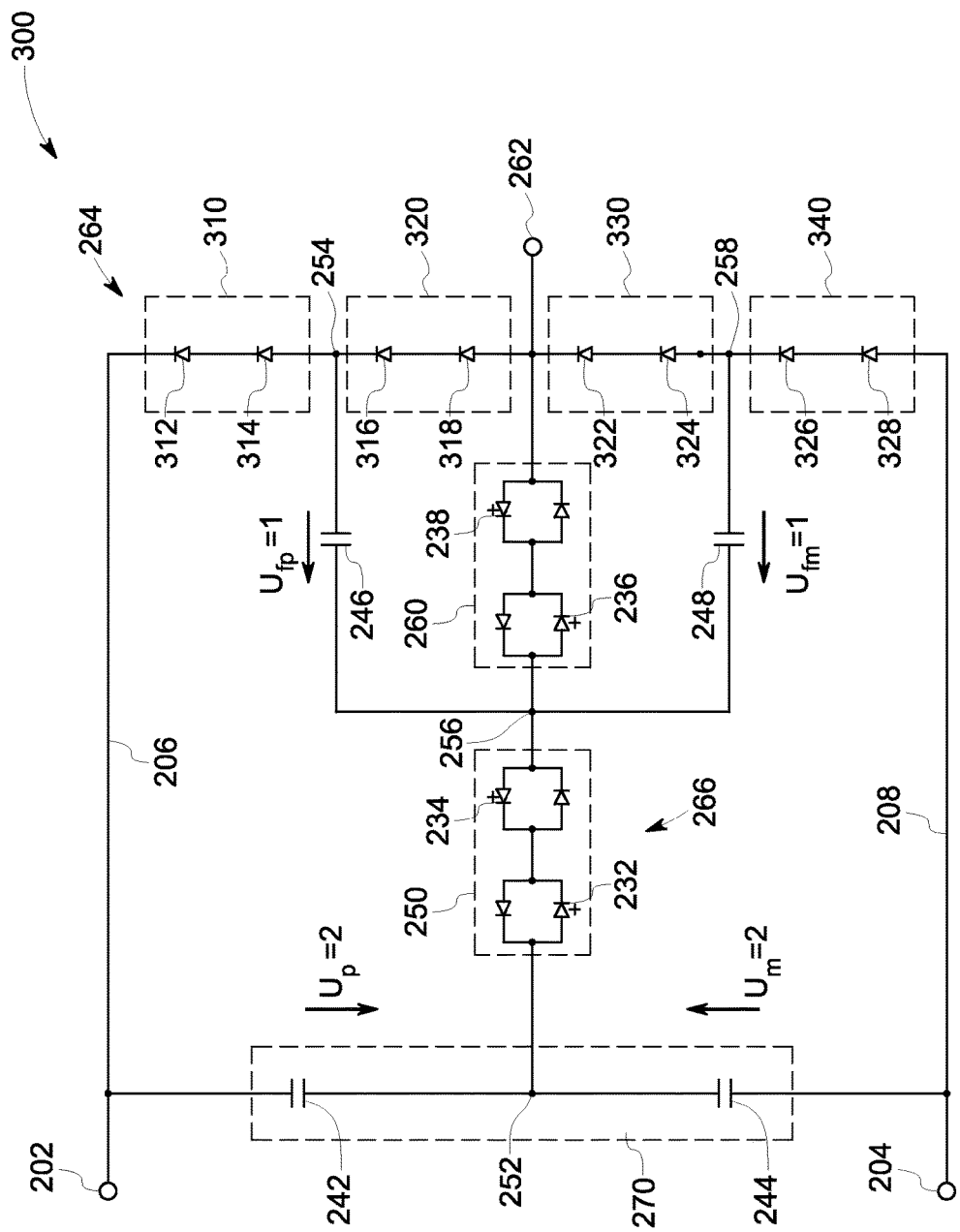
FIG. 3 is a detailed circuit diagram of a converter having another nested neutral point piloted configuration that may be used in the power conversion system shown in FIG. 1 in accordance with another exemplary embodiment of the present disclosure.

FIG. 3 illustrates a detailed circuit diagram of another embodiment of a phase leg 300 of a three-phase power converter that may be used in the power conversion device 120 shown in FIG. 1 in accordance with an exemplary embodiment of the present disclosure. In a particular configuration, the phase leg 300 can be implemented as one phase of the first three-phase converter or rectifier 122 for converting AC voltages into DC voltages. The phase leg 300 shown in FIG. 3 is substantially the same as the phase leg 200 shown in FIG. 2, thus similar elements will not be described in detail herein. One difference of the phase leg 300 is that each of the four switch units 310, 320, 330, 340 employs two passive or uncontrollable devices such as diodes coupled in series to replace the controllable switching devices as those shown in FIG. 2.

More specifically, in the embodiment of FIG. 3, the first switch unit 310 includes two diodes 312, 314 coupled in series, the second switch unit 320 includes two diodes 316, 318 coupled in series, the third switch unit 330 includes two diodes 322, 324 coupled in series, and the fourth switch unit 340 includes two diodes 326, 328 coupled in series. In other embodiments, any number of diodes can be coupled in series in each of switch units 310, 320, 330, 340 to share the DC voltages. A person skilled in the art will understand that three phase legs 300 may be coupled together to form the three-phase power converter and the operations of one phase leg can be replicated to operate in the three-phase power converter including three phase legs.

Figure 4:
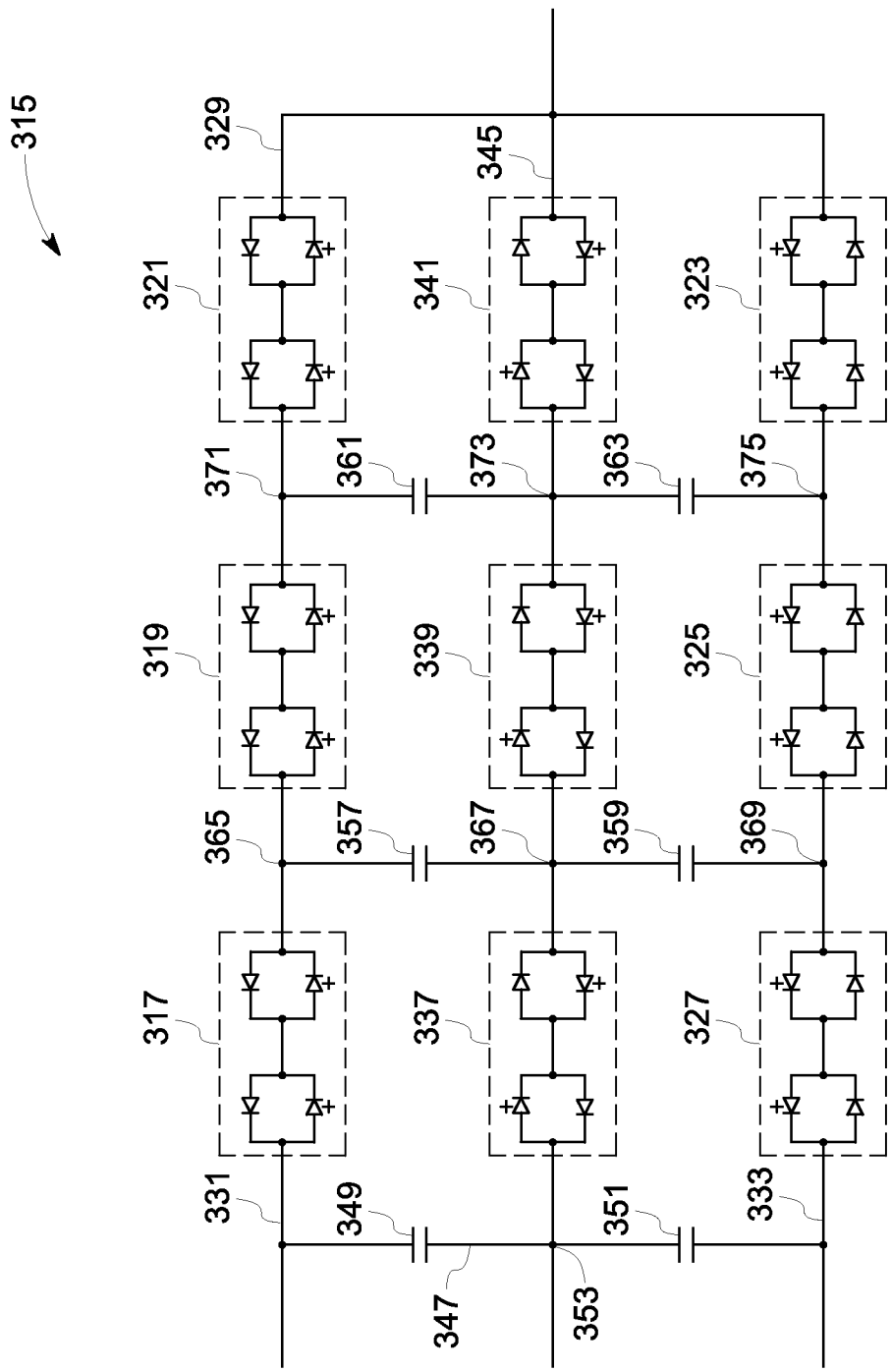
FIG. 4 illustrates a detailed circuit diagram of a seven-level nested NPP phase leg that may be used in the three-phase power converter in accordance with one embodiment of the present disclosure.

FIG. 4 illustrates a detailed circuit diagram of a seven-level nested NPP phase leg 315 that may be used in the three-phase power converter in accordance with one embodiment of the present disclosure. The seven-level NPP phase leg includes six switch units 317, 319, 321, 323, 325, 327 coupled in series to form a longitudinal arm 329. In the exemplary embodiment, each of the six switch units 317, 319, 321, 323, 325, 327 includes two switching devices connected in a head-to-tail manner such that low-voltage rating semiconductor switching devices can be used to substantially equally share the voltage applied from a positive rail 331 and a negative rail 333. More specifically, the two switching devices are coupled in the same manner as discussed in FIG. 2 with respect to the switching devices in the four switch units 210, 220, 230, 240. In other embodiments, each of switch units 317, 319, 321, 323, 325, 327 may include any number of series-connected switching devices according to practical requirements.

The phase leg 315 also includes three switch units 337, 339 and 341 coupled in series to form a transverse arm 345. Each of the three switch units 337, 339 and 341 includes two switching devices connected in the same manner as the discussed in FIG. 2 with respect to the switching devices in the two switch units 250, 260.

Further referring to FIG. 4, the phase leg 315 is coupled to a DC link 347 via the positive rail 331 and the negative rail 333. In the exemplary embodiment, the DC link 347 includes a first capacitor 349 and a second capacitor 351 coupled in series between the positive rail 331 and the negative rail 333. The first and second capacitors 349, 351 are commonly connected to define a respective neutral point or middle point 353 which is further connected to one terminal of the traverse arm 345. As will be described with more details below, the voltage at the neutral point or middle point 353 can be controlled by implementing the proposed unified CMV injection algorithm/method to at least achieve the function of DC link voltage balancing. The phase leg 315 also includes a first flying capacitor 357, a second flying capacitor 359, a third flying capacitor 361, and a fourth flying capacitor 363. One terminal of the first flying capacitor 357 is connected to a joint connection 365 defined between the first switch unit 317 and the second switch unit 319, and the other terminal of the first flying capacitor 357 is connected to a joint connection 367 defined between the two switch units 337, 339. One terminal of the second flying capacitor 359 is connected to the joint connection 367, and the other terminal of the second flying capacitor 359 is connected to a joint connection 369 defined between the fifth switch unit 325 and the sixth switch unit 327. Similarly, the third flying capacitor 361 is coupled between the two switch units 319, 321 at a joint connection 371 with the other terminal connected to a joint connection 373 between two switch units 339, 341. Furthermore, the fourth flying capacitor is coupled between the two switch units 323, 325 at a joint connection 375 with the other terminal connected to a joint connection 373 between two switch units 339, 341. The seven-level NPP converter can be operated similarly to a five-level NPP converter as discussed in FIG. 2 with necessary modifications known to a person skilled in the art.

Figure 5:
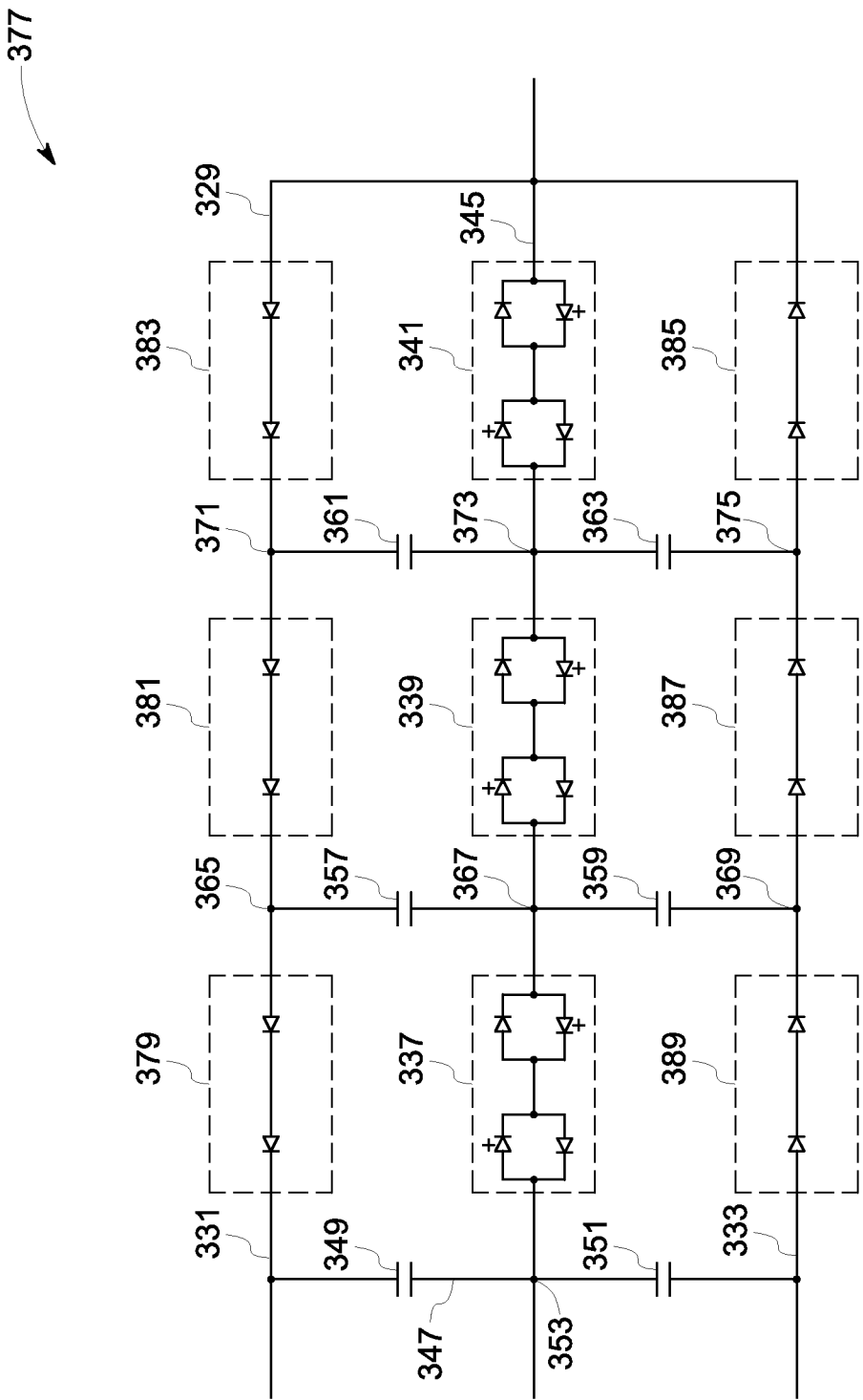
FIG. 5 is a detailed circuit diagram of a seven-level phase leg of a three-phase converter having another nested neutral point piloted configuration that may be used in the power conversion system shown in FIG. 1 in accordance with another exemplary embodiment of the present disclosure.

FIG. 5 illustrates a detailed circuit diagram of another embodiment of a phase leg 377 of a three-phase power converter that may be used in the power conversion device 120 shown in FIG. 1 in accordance with an exemplary embodiment of the present disclosure. In a particular configuration, the phase leg 377 can be implemented as one phase of the first three-phase converter or rectifier 122 for converting AC voltages into DC voltages. The phase leg 377 shown in FIG. 5 is substantially the same as the phase leg 315 shown in FIG. 4, thus similar elements will not be described in detail herein. One difference of the phase leg 377 is that each of the six switch units 379, 381, 383, 385, 387, 389 employs two passive or uncontrollable devices such as diodes coupled in series to replace the controllable switching devices as those shown in FIG. 4. More specifically, in the embodiment of FIG. 5, each of the switch units 379, 381, 383, 385, 387, 389 includes two diodes. In other embodiments, any number of diodes can be coupled in series in each of switch units 379, 381, 383, 385, 387, 389 to share the DC voltages. A person skilled in the art will understand that three phase legs 377 may be coupled together to form the three-phase power converter and the operations of one phase leg can be replicated to operate in the three-phase power converter including three phase legs.

Figure 6:
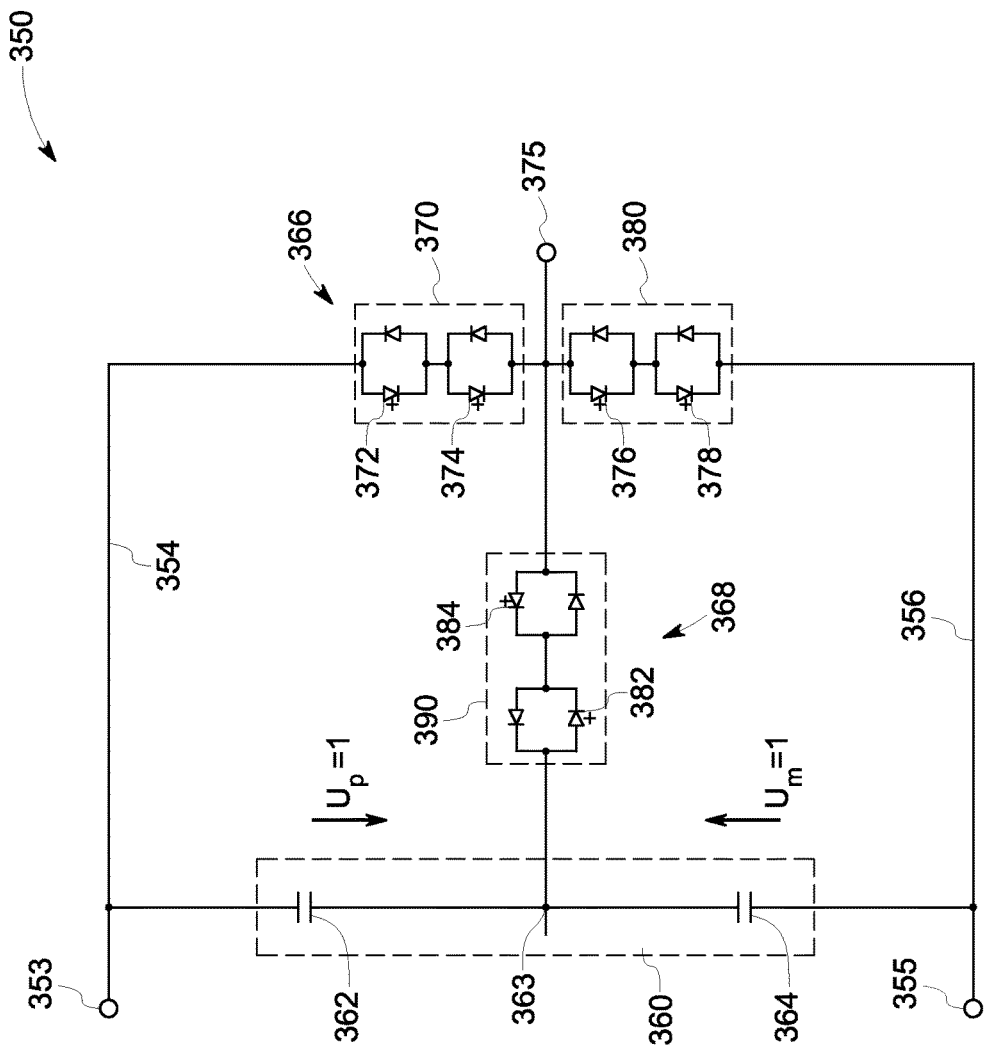
FIG. 6 is a detailed circuit diagram of a converter having another nested neutral point piloted configuration that may be used in the power conversion system shown in FIG. 1 in accordance with another exemplary embodiment of the present disclosure.

FIG. 6 illustrates a detailed circuit diagram of another embodiment of a three-level nested NPP phase leg 350 that may be used in the three-phase power converter in accordance with one embodiment of the present disclosure. The three-level phase leg 350 can be controlled by implementation of the proposed unified CMV injection algorithm and/or method as will be disclosed in more detail below. As shown in FIG. 6, the three-level phase leg 350 may include a DC link 360 consisting of a first capacitor 362 and a second capacitor 364. The first and second capacitors 362, 364 are connected together to form a neutral or middle point 363. The three-level phase leg 350 also includes a longitudinal arm 366 and a traverse arm 364. The longitudinal arm 366 is formed by connecting a first switch unit 370 and a second switch unit 380 in series between a positive rail 354 and a negative rail 356. In the illustrated embodiment, the first switch unit 370 includes series-connected a first switching device 372 and a second switching device 374, and the second switch unit 380 includes series-connected a third switching device 376 and a fourth switching device 378. In other embodiments, the first and second switch units 370, 380 may include more than two switching devices according to practical requirements. In the illustrated embodiment, the traverse arm 368 includes a switch unit 390 which includes a fifth switching device 382 and a sixth switching device 384, which are connected in a back-to-back manner between the neutral point 363 and an output port 375. During operation, the various switching devices 372, 374, 376, 378, 382, 384 are switched on and/off in a predefined switching pattern to allow DC voltage received at two input ports 353, 355 to be converted to AC voltage at the output port 375. A person skilled in the art will understand that three phase legs 350 may be coupled together to form the three-level three-phase power converter and the operations of one three-level phase leg can be replicated to operate in the three-level three-phase power converter including three phase legs.

Figure 7:
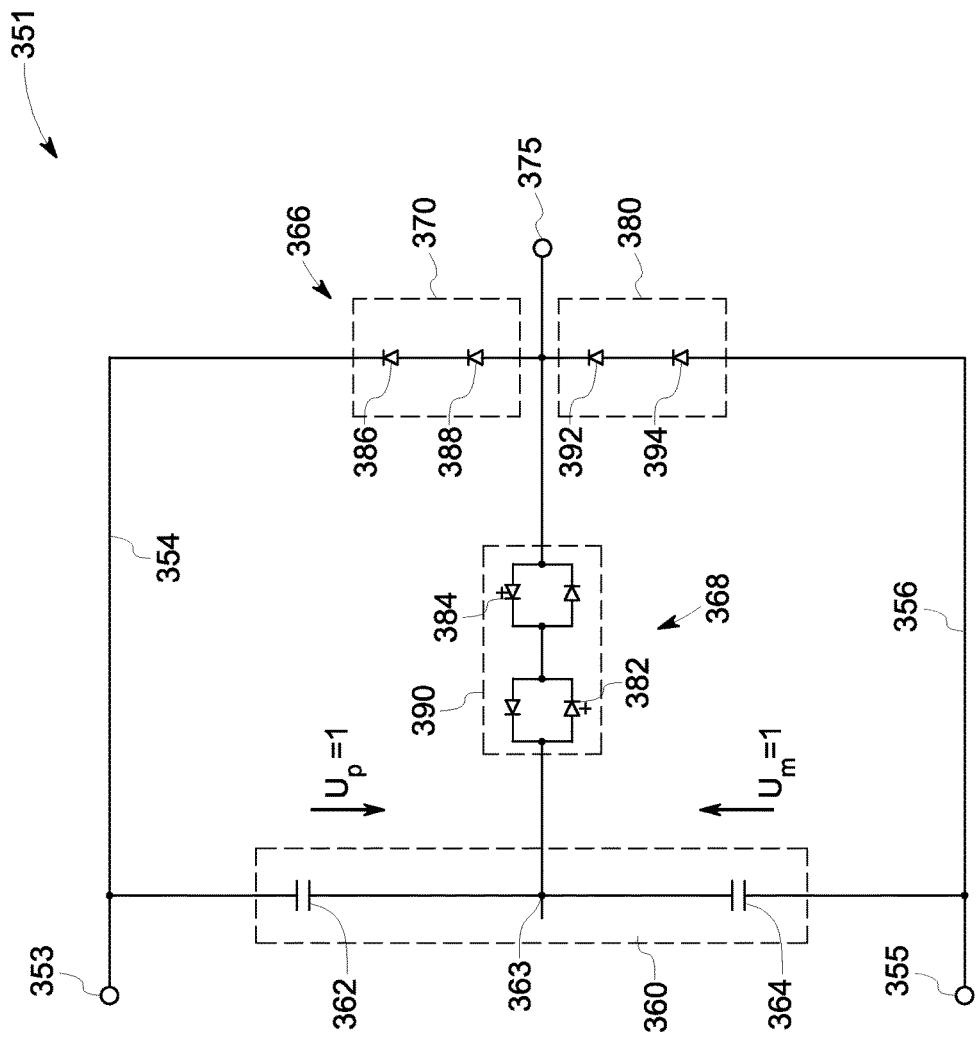
FIG. 7 is a detailed circuit diagram of a converter having another nested neutral point piloted configuration that may be used in the power conversion system shown in FIG. 1 in accordance with another exemplary embodiment of the present disclosure.

FIG. 7 illustrated a detailed circuit diagram of a three-level nested NPP phase leg 351 that may be used in the power conversion system shown in FIG. 1 in accordance with another embodiment of the present disclosure. The three-level phase leg 351 can also be controlled by implementation of the proposed unified CMV injection algorithm and/or method as will be disclosed in more detail below. The three-level phase leg 351 shown in FIG. 7 is substantially similar to the three-level phase leg 350 shown in FIG. 6. One difference of the three-level phase leg 351 is that in the first switch unit 370 includes two passive or uncontrollable switching devices (e.g., diodes) 386, 388, and the second switch unit 380 includes two passive or uncontrollable switching devices (e.g., diodes) 392, 394. In other embodiments, the first and second switch unit 370, 380 may include more than two passive or uncontrollable switching devices.

It should be understood that the multi-level nested NPP topology shown in FIGS. 2-7 are just for illustrative purposes to facilitate explanation of the unified CMV injection algorithm/method and that the principles disclosed herein can be extended to other multi-level converters, including but not limited to, neutral point clamped topology, active neutral-point clamped topology, etc.

Figure 8:
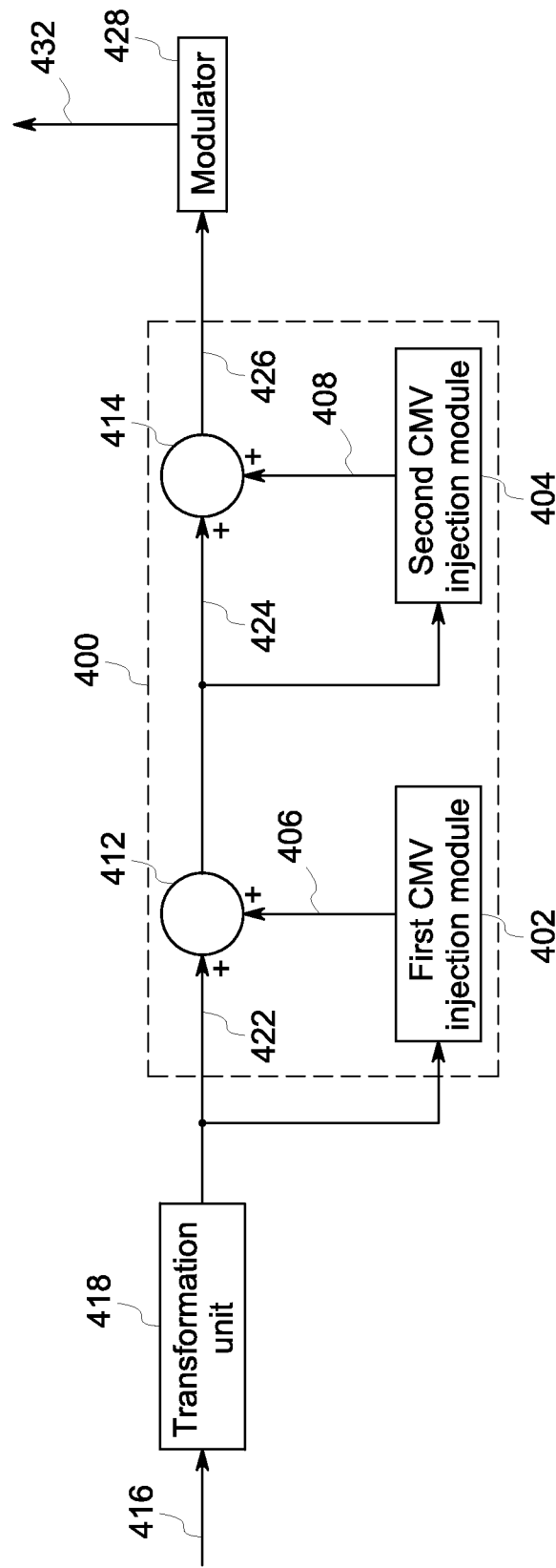
FIG. 8 is a block diagram of an unified common mode voltage injection module in accordance with another exemplary embodiment of the present disclosure.

FIG. 8 illustrates a block diagram of a unified common mode voltage (CMV) injection module 400 that may be implemented by the control device 140 shown in FIG. 1 to achieve multiple functions in association with the operation of the power conversion system 100. As illustrated in FIG. 8, the unified CMV injection module 400 includes a first CMV injection module 402 and a second CMV injection module 404. In other embodiments, the unified CMV injection module 400 may include more than two CMV injection modules. Still in some embodiments, it is possible to implement the unified CMV injection module 400 without the first CMV injection module 402. The first CMV injection module 402 is configured to inject a first CMV signal 406 which is used to modify at least one command signal or modulation signal 422 to achieve at least one first function in association with the operation of the power conversion system 100. In one embodiment, the at least one command signal 422 includes three-phase voltage commands which are generated by transforming voltage commands 416 from d-q domain into three-phase domain using a transformation unit 418. In one specific embodiment, the first CMV injection module 402 may be configured to generate the first CMV signal 406 through min-max calculation. More specifically, the first CMV injection module 402 may be configured to generate the first CMV signal 406 using the following equation:

$$u_0 = \frac{\max(u_{dm,a,b,c}) + \min(u_{dm,a,b,c})}{2}, \quad (1)$$

where $u_0$ is the first CMV signal, $\max(u_{dm,a,b,c})$ represents an instantaneous maximum voltage identified from three-phase voltages, and $\min(u_{dm,a,b,c})$ represents instantaneous minimum voltage identified from three-phase voltages. In other embodiments, the first CMV injection module 402 may be configured to generate a pure third-order harmonic signal which has three times fundamental frequency. Injecting the first CMV signal 406 through min-max calculation or having pure third-order harmonic signal can increase the DC voltage utilization and reduce the total harmonic distortion at the output of the second power converter 126. The first CMV signal 406 is combined with the each of three-phase voltage commands 422 at a first summation element 412 which provides first modified three-phase voltage commands 424 accordingly.

Further referring to FIG. 8, in one embodiment, the second CMV injection module 404 is configured to generate a second CMV signal 408 which is used to modify one or more command signals to achieve at least one second function in association with the operation of the power conversion system 100. In the illustrated embodiment, the second CMV signal 408 is generated according to the first modified three-phase voltage commands 424 provided from the first summation element 412. In the illustrated embodiment of FIG. 8, the second CMV signal 408 is supplied to a second summation unit 414 which combines the second CMV signal 408 with the first modified three-phase voltage commands 424 and provides second modified voltage commands 426 In the illustrated embodiment of FIG. 8, the second modified voltage commands 426 are supplied to a modulator 428 which is configured to generate control signals 432 for turning on and off the various switching devices in the second converter 126 to allow the at least one first function and the at least one second function to be achieved.

Figure 9:
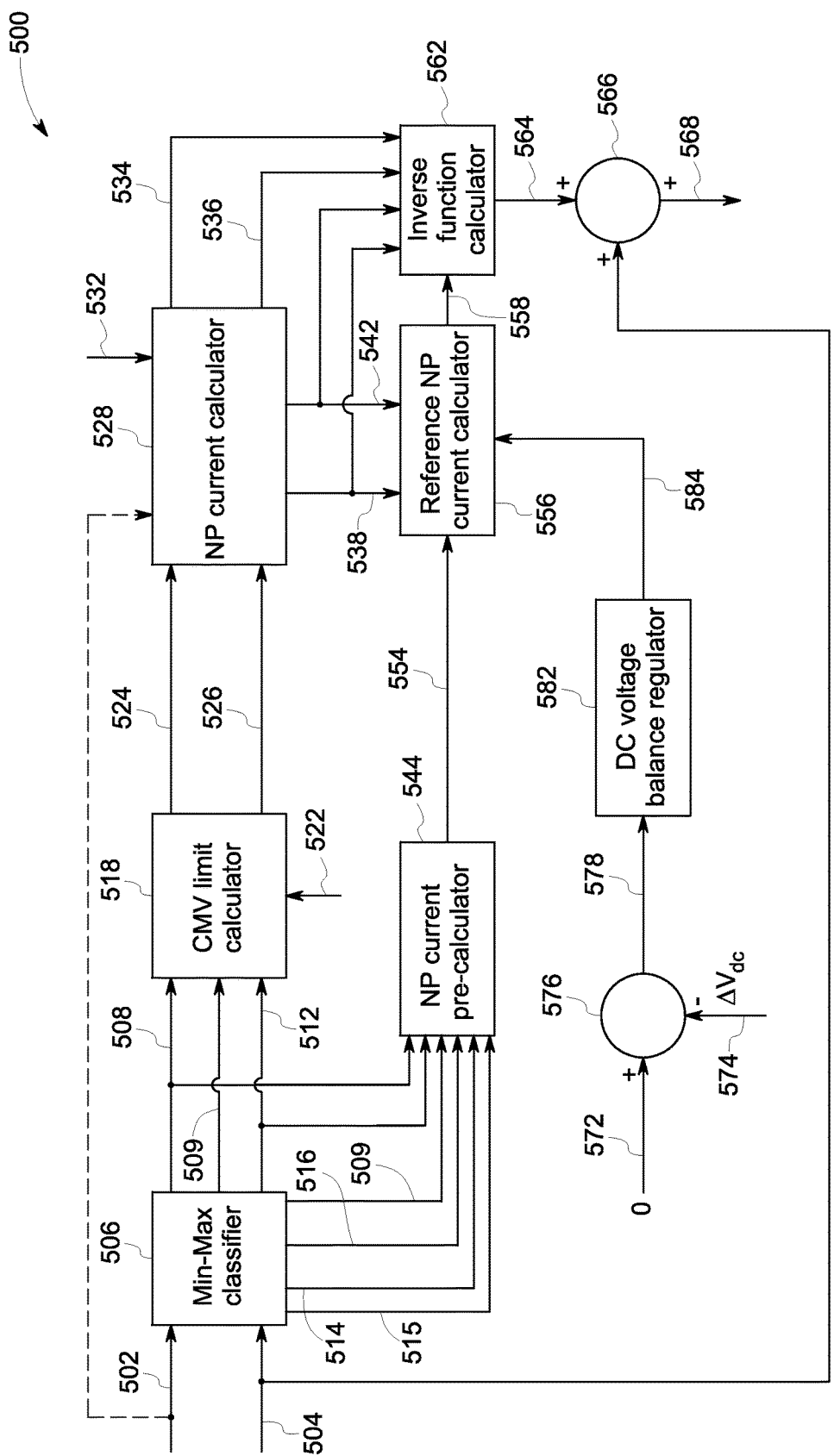
FIG. 9 is a block diagram illustrating detailed structures of a second CMV injection module shown in FIG. 8 in accordance with one exemplary embodiment of the present disclosure.

FIG. 9 is a block diagram illustrating detailed structures of a CMV injection module 500 in accordance with one exemplary embodiment of the present disclosure. The CMV injection module 500 may be implemented as the second CMV module 404 shown in FIG. 8 for making further modification to the one or more voltage commands 424 that has been modified by the first CMV signal 406. In the illustrated embodiment of FIG. 9, the CMV injection module 500 includes a min-max classifier 506, a CMV limit calculator 518, a neutral point (NP) current calculator 528, a NP current pre-calculator 544, a reference NP current calculator 556, an inverse function calculator 562, and a DC voltage balance regulator 582.

In one embodiment, the min-max classifier 506 is configured to receive voltage commands such as three-phase voltage commands 504. The min-max classifier 506 is further configured to identify a maximum voltage command 508 and a minimum voltage command 512 at any instant from the three-phase voltage commands 504. In some embodiments, the min-max classifier 506 may be further configured to identify a medium voltage command 509 at any instant from the three-phase voltage commands 504. The min-max classifier may compute the maximum voltage command 508, the medium voltage command 509, and a minimum voltage command 512 based on the following equations:

$$U_{max}=\max(U_a^*,U_b^*,U_c^*), U_{mid}=(U_a^*,U_b^*,U_c^*), U_{min}=(U_a^*,U_b^*,U_c^*)$$

where $U_{max}$ is an instantaneous maximum voltage, $U_{mid}$ is an instantaneous medium voltage and $U_{min}$ is an instantaneous minimum voltage, $U_a^*$, $U_b^*$, $U_c^*$ are instantaneous voltages as phase a, phase b and phase c respectively.

The same min-max classifier 506, or in some embodiments a different min-max classifier may be configured to receive three-phase current commands 502 and identify a current command 516 corresponding to the maximum voltage command 508, a current command 514 corresponding to the minimum voltage 512, and a current command 515 corresponding to a medium voltage 509 at any instant from the three-phase current commands 502. The instantaneous maximum voltage 508 the instantaneous minimum voltage 512 and the instantaneous medium voltage 509 are supplied to the CMV limit calculator 518 which is configured to calculate a maximum CMV limit 524 and a minimum CMV limit 526 according to one or more criteria. In one particular embodiment, the CMV limit calculator 518 generates the maximum and minimum CMV limits 524, 526 based on a three-level CMV limit signal 522. In one embodiment, the three-level CMV limit may be computed based on a three-level carrier band voltage. Either the maximum CMV limit 524 or the minimum CMV limit 526 is set to ensure that the modified voltage command signal does not exceed or fall below an original three level carrier band voltage. In some embodiments, either or both the maximum and minimum CMV limits 524, 526 are set to ensure the one or more voltage commands after CMV injection does not change signs (e.g., from positive to negative or from negative to positive).

when $U_{mid} > 0$, $$U_{cm\_max}=\min(1-U_{max}, 1-U_{mid}, 0-U_{min}), \text{ and}$$

$$U_{cm\_min}=\max(0-U_{max}, 0-U_{mid}, -1-U_{min})$$

Similarly, when $U_{mid} < 0$, $$U_{cm\_max}=\min(1-U_{max}, 0-U_{mid}, 0-U_{min}), \text{ and}$$

$$U_{cm\_min}=\max(0-U_{max}, -1-U_{mid}, -1-U_{min})$$

where $U_{cm\_max}$ is the maximum common mode voltage limit and $U_{cm\_min}$ is the minimum common mode voltage limit.

In another embodiment, the three-level CMV limit may be computed based on a three-level carrier band voltage as discussed above; however, the medium voltage command 509 may change the sign after the CMV injection. Thus, there is no limitation on CMV to maintain the carrier band of the medium voltage command 509.

In one embodiment, the maximum CMV limit 524 and the minimum CMV limit 526 are supplied to the NP current calculator 528 which is configured to calculate NP current signals after CMV injection based at least in part on the maximum and minimum CMV limits 524, 526, and the three phase current 502. The calculation of the NP current signals after CMV injection could be done online or offline.

In other embodiments, the NP current calculator 528 may calculate the maximum NP current 538 and the minimum NP current 542 in an analytical manner. For example, one or more linear equations may be used for calculation of the maximum and minimum NP current signals 538, 542. In one embodiment, the maximum and minimum NP current limits 538, 542 are calculated based at least in part on the maximum CM limit 524, the minimum CM limit 526, and three-phase current commands 502. In other embodiments, instead of using the three-phase current commands 502 for calculation, the NP current calculator 528 may calculate the maximum NP current 538 and the minimum NP current 542 based at least in part on the maximum CM limit 524, the minimum CM limit 526, and three-phase feedback current signals 532 (shown in dashed line) measured with one or more current sensors at the output of the second converter 126. Assuming that a common mode current $i(U_{cm})$ may be represented as:

$$i(U_{cm}) = \left(1 - \frac{U_{max}+U_{cm}}{V_{tri}}\right)i_{umax} + \left(\left|1 - \frac{U_{mid}+U_{cm}}{V_{tri}}\right|\right)i_{umid} + \left(1 - \frac{U_{min}+U_{cm}}{V_{tri}}\right)i_{umin}$$

where $U_{cm}$ represents a common mode voltage, $V_{tri}$ represents a carrier band voltage, $i_{umax}$, $i_{umid}$, $i_{umin}$ represent an instantaneous current corresponding to the maximum voltage command, medium voltage command, and minimum voltage command respectively.

As already discussed above, in embodiments where the one or more voltage commands do not change signs after the CMV injection, a relationship between the neutral point current and the common mode voltage can be represented as a linear relationship. However, in embodiments, where the one or more voltage commands change signs after the CMV injection, a relationship between the neutral point current and the common mode voltage can be represented as a non-linear relationship which has more than two characteristic points.

Based on the above equation, the maximum neutral point current limit ($i_{np\_max}$) and the minimum neutral point current limit ($i_{np\_min}$) may be determined. The common mode voltage $U_{cm}$ may include a maximum common mode voltage limit represented by ($U_{cm\_max}$) and a minimum common mode voltage limit ($U_{cm\_min}$). In situations where the $i(U_{cm\_max})>i(U_{cm\_min})$, the maximum neutral point current limit ($i_{np\_max}$) may be represented as:

$$i_{np\_max} = \left(1 - \frac{U_{max}+U_{cm\_max}}{V_{tri}}\right)i_{umax} + \left(\left|1 - \frac{U_{mid}+U_{cm\_max}}{V_{tri}}\right|\right)i_{umid} + \left(1 - \frac{U_{min}+U_{cm\_max}}{V_{tri}}\right)i_{umin}$$

where the common mode voltage at the maximum neutral point current represented by $$U_{cm i_{np\_max}}$$

will be equal to the maximum common mode voltage limit $U_{cm\_max}$.

Similarly, for $i(U_{cm\_max}) > i(U_{cm\_min})$, the minimum neutral point current limit ($i_{np\_min}$) may be represented as:

$$i_{np\_min} = \left(1 - \frac{U_{max} + U_{cm\_min}}{V_{tri}}\right)i_{umax} + \left(\left|1 - \frac{U_{mid} + U_{cm\_min}}{V_{tri}}\right|\right)i_{umid} + \left(1 - \frac{U_{min} + U_{cm\_min}}{V_{tri}}\right)i_{umin}$$

where the common mode voltage at the minimum neutral point current represented by $$U_{cmi_{np\_min}}$$

will be equal to the minimum common mode voltage limit $U_{cm\_min}$.

Alternatively, the $i(U_{cm\_max}) < i(U_{cm\_min})$, the maximum neutral point current limit ($i_{np\_max}$) may be represented as:

$$i_{np\_max} = \left(1 - \frac{U_{max} + U_{cm\_min}}{V_{tri}}\right)i_{umax} + \left(\left|1 - \frac{U_{mid} + U_{cm\_min}}{V_{tri}}\right|\right)i_{umid} + \left(1 - \frac{U_{min} + U_{cm\_min}}{V_{tri}}\right)i_{umin}$$

where the common mode voltage at the maximum neutral point current represented by $$U_{cmi_{np\_max}}$$

will be equal to the minimum common mode voltage limit $U_{cm\_min}$.

Similarly, for $i(U_{cm\_max}) < i(U_{cm\_min})$, the minimum neutral point current limit ($i_{np\_min}$) may be represented as:

$$i_{np\_min} = \left(1 - \frac{U_{max} + U_{cm\_max}}{V_{tri}}\right)i_{umax} + \left(\left|1 - \frac{U_{mid} + U_{cm\_max}}{V_{tri}}\right|\right)i_{umid} + \left(1 - \frac{U_{min} + U_{cm\_max}}{V_{tri}}\right)i_{umin}$$

where the common mode voltage at the minimum neutral point current represented by $$U_{cmi_{np\_min}}$$

will be equal to the maximum common mode voltage limit $U_{cm\_max}$.

In embodiments, where the relationship between the neutral point current and the common mode voltage is non-linear having more than two characteristic points, the neutral point current is computed separately in different sections.

Further referring to FIG. 9, the maximum NP current limit 538 and the minimum NP current limit 542 are supplied to the reference NP current calculator 556 which is configured to calculate a reference NP current 558 represented by ($i^*_{np}$) based at least in part on a pre-calculated NP current 554, a gain signal 584, and the maximum and minimum NP current limit signals 538, 542. The reference NP current calculator receives the pre-calculated NP current 554 from an NP current pre-calculator 544.

In one embodiment, the pre-calculated NP current 554 is calculated by the NP current pre-calculator 544 based at least in part on the instantaneous maximum, medium, and minimum voltage commands 508, 509, 512 and instantaneous maximum, medium, and minimum current commands 516, 515, 514. More specifically, in one embodiment, the NP current pre-calculator 544 may calculates the pre-calculated NP current 554 using the following equation:

$$i^*_{np_{pre}} = \left(1 - \frac{U_{max} + 0}{V_{tri}}\right)i_{umax} + \left(\left|1 - \frac{U_{mid} + 0}{V_{tri}}\right|\right)i_{umid} + \left(1 - \frac{U_{min} + 0}{V_{tri}}\right)i_{umin}$$

Furthermore, the reference NP current calculator 556 calculates the reference NP current 558 based on the following equations:

$$i^*_{np} = i^*_{np\_pre}(1-g_{cm}) + i_{np\_max} \times g_{cm} \text{ for } g_{cm} > 0$$

$$i^*_{np} = i^*_{np\_pre} \text{ for } g_{cm} = 0$$

$$i^*_{np} = i^*_{np\_pre}(1+g_{cm}) - i_{np\_min} \times g_{cm} \text{ for } g_{cm} < 0$$

where $i^*_{np\_pre}$ represents a pre-calculated NP current and $g_{cm}$ represents a common mode gain.

In one embodiment, the gain signal 584 is generated from a DC voltage balance regulator 582 which may be a proportional-integral (PI) regulator or any other similar regulator. The DC voltage balance regulator 582 receives a voltage error signal 578 which is generated from a summation element 576 by subtracting a DC voltage difference signal 574 from a zero DC voltage command signal 572. The DC voltage difference signal 574 represents a voltage difference between the first capacitor 242 and the second capacitor 244 of the DC link 270 of FIG. 2 and FIG. 3. The zero DC voltage command signal 572 is set to indicate that the desired DC voltage difference between the two capacitors should be zero.

With continuing reference to FIG. 9, the reference NP current signal 558 calculated with the reference NP current calculator 556 is further supplied to the inverse function calculator 562. The inverse function calculator 562 is configured to calculate a CMV signal 564 based at least in part on the reference NP current signal 558, maximum and minimum NP current limits 538, 542, and the first and second CMV voltage 534, 536 corresponding to the maximum and minimum NP current limits 538, 542. In one embodiment, the inverse function calculator 562 may use one or more linear equations defined between the neutral point current and the common mode voltage for calculation of the desired CMV signal 564. One such equation may be represented as:

$$U_{cm} = U_{cmi_{np\_min}} + \frac{i^*_{np} - i_{np\_min}}{i_{np\_max} - i_{np\_min}} \times \left(U_{cmi_{np\_max}} - U_{cmi_{np\_min}}\right)$$

In other embodiments, the inverse function calculator 562 may obtain the CMV signal be referring to a lookup table. The CMV signal 564 is supplied to a summation element 566 which provides one or more modified voltage command signals or modulation signals 568 by combining the CMV signal 564 with the one or more voltage command signals 504. The one or more modified voltage command signals or modulation signals 568 are supplied to the modulator 428 shown in FIG. 8 to achieve the function of balancing the DC voltages at the DC capacitors 242, 244 of the DC link 270.

Figure 10:
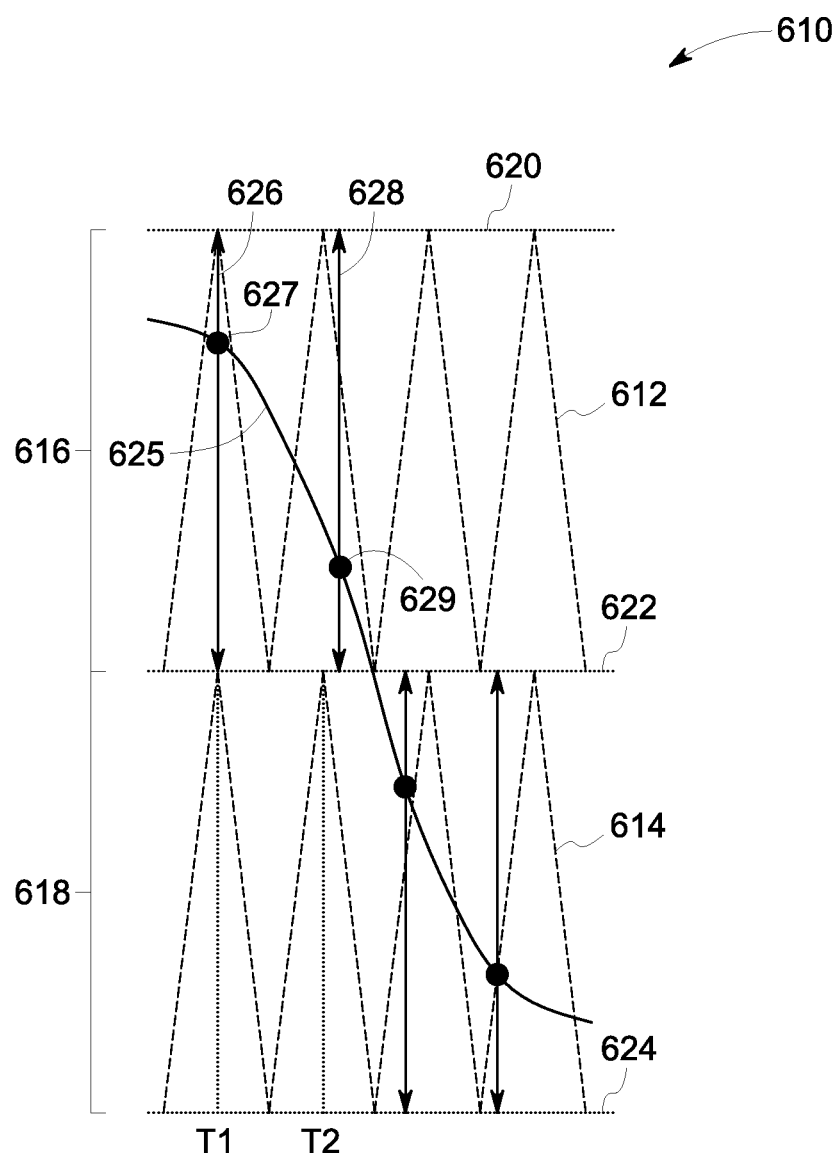
FIG. 10 is an exemplary graphical representation depicting a three level CMV limit as applied to a three-level converter in accordance with another exemplary embodiment of the present disclosure.

FIG. 10 is an exemplary graphical representation 610 depicting a three level CMV limit 522 (FIG. 11) as applied to a three-level converter in accordance with an embodiment of the invention. The representation 610 depicts two three-level carrier waves 612 and 614. The two three-level carrier waves 612 and 614 are located within two three-level carrier band voltages 616 and 618 respectively. The carrier band voltage 616 is defined by a first voltage level 620 and a second voltage level 622. Similarly, the carrier band voltage 618 is defined by the second voltage level 622 and the third voltage level 624. As shown in schematic representation 610, a maximum CMV limit for a reference voltage 625 in the carrier band 616 in the three-level converter is represented by arrows 626, 628 at time instants T1 and T2 respectively. At time instant T1, a maximum CMV limit is equal to a subtraction between the first voltage level 620 and the reference voltage level 627, which is a positive number; and the minimum CMV limit is equal to a subtraction between the second voltage level 622 and the reference voltage level 627, which is a negative number. At time instant T2, the maximum CMV limit is equal to a subtraction between the voltage level 620 and the reference voltage level 629; the minimum CMV limit is equal to a subtraction between the reference voltage level 629 and the second voltage level 622. Similarly, the maximum CMV limit for the reference voltage 625 at this carrier band 618 is equal to the distance between the second voltage level 622 and the reference voltage level 627, 629 at each time instant; the minimum CMV limit for the reference voltage 625 at this carrier band 618 is equal to the distance between the third voltage level 624 and the reference voltage level 627, 629 at each time instant. The sign for the maximum CMV limit is positive and the sign for the minimum CMV limit is negative. The final maximum CMV limit for the three phase system will be the minimum value out of the three maximum CMV limits for the three phase respectively; and the final minimum CMV limit for the three phase system will be the maximum value out of the three minimum CMV limits for the three phase respectively.

Figure 11:
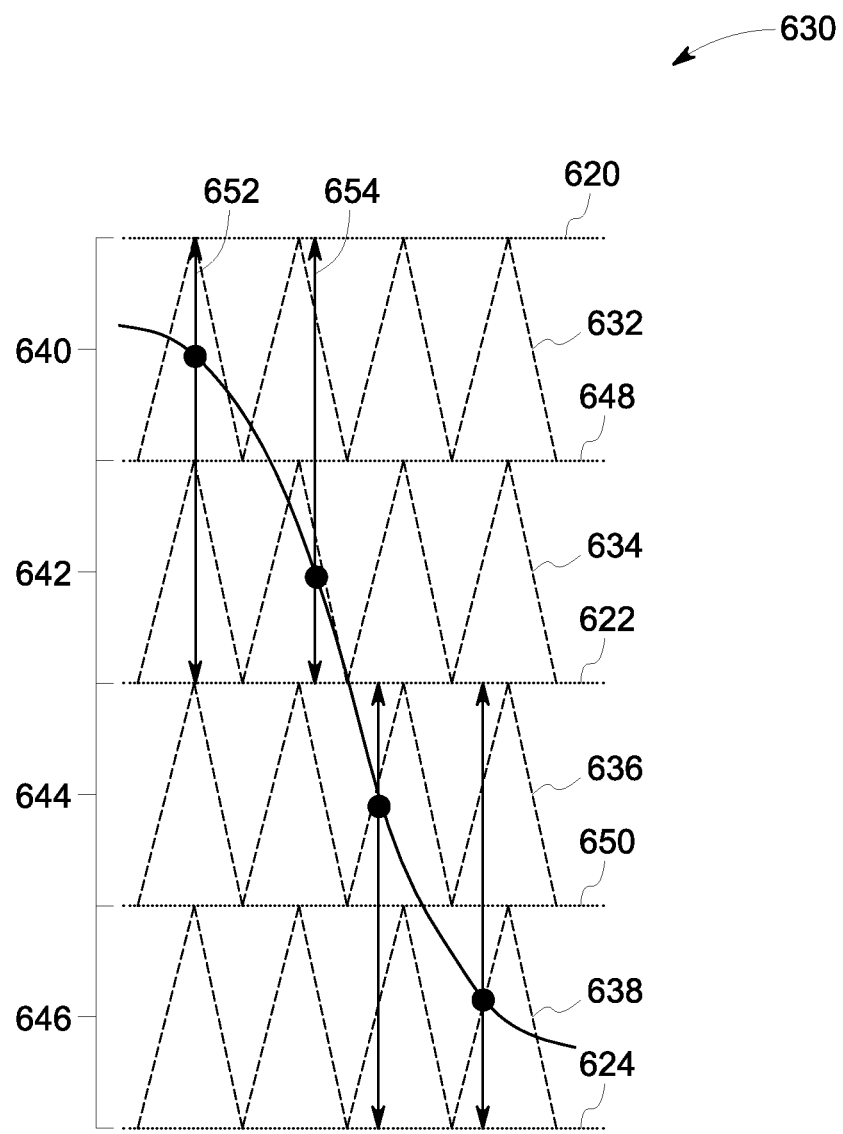
FIG. 11 is an exemplary graphical representation depicting a three level CMV limit as applied to a five-level converter in accordance with an exemplary embodiment of the present disclosure.

FIG. 11 is an exemplary graphical representation 630 depicting a three level CMV limit as applied to a five-level converter in accordance with an embodiment of the invention. For a five-level converter, the representation 630 depicts four five-level carrier waves 632, 634, 636, 638. The four five-level carrier waves 632, 634, 636, 638 are located within four five-level carrier band voltages 640, 642, 644, 646 respectively. The carrier band voltage 640 is defined by the first voltage level 620 (FIG. 8) and a fourth voltage level 648. The carrier band voltage 642 is defined by the fourth voltage level 648 and the second voltage level 622 (FIG. 8). Similarly, the carrier band voltage 644 is defined by the second voltage level 622 and a fifth voltage level 650, and the carrier band voltage 646 is defined by the fifth voltage level 650 and the third voltage level 624 (FIG. 8). Furthermore, the maximum CMV limit and the minimum CMV limit for the five-level converter is represented by arrows 652, 654 at time instants T1 and T2 respectively. As can be seen, the CMV limit for the five-level converter at carrier band 640 and 642 are thus equal to the CMV limit for the three-level converter at carrier band 616. Therefore, the same three-level CMV limit can be applied to the five-level converter.

Figure 12:
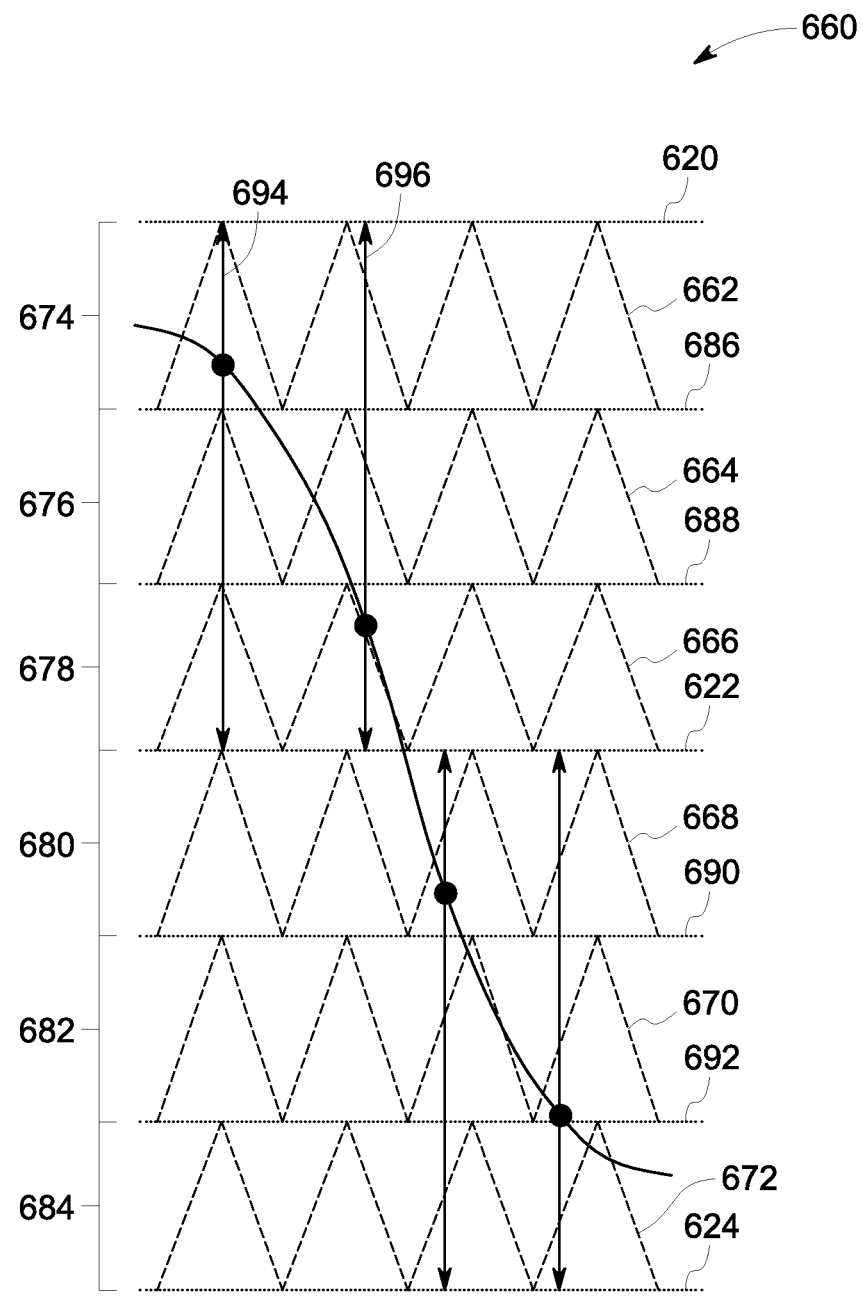
FIG. 12 is an exemplary graphical representation depicting a three level CMV limit as applied to a seven-level converter in accordance with an exemplary embodiment of the present disclosure.

FIG. 12 is an exemplary graphical representation 660 depicting a three level CMV limit as applied to a seven-level converter in accordance with an embodiment of the invention. For a seven-level converter, the representation 660 depicts six seven-level carrier waves 662, 664, 666, 668, 670, 672. The six seven-level carrier waves 662, 664, 666, 668, 670, 672 are located within six seven-level carrier band voltages 674, 676, 678, 680, 682, 684 respectively. The carrier band voltage 674 is defined by the first voltage level 620 (FIG. 8) and a fourth voltage level 686. The carrier band voltage 676 is defined by the fourth voltage level 686 and the fifth voltage level 688. The carrier band voltage 678 is defined by the fifth voltage level 688 and the second voltage level 622 (FIG. 8). Similarly, the carrier band voltages 680, 682 and 684 may be defined by a sixth voltage level 690, a seventh voltage level 692 and the third voltage level (FIG. 8). The maximum CMV limit and the minimum CMV limit for the five-level converter is represented by arrows 694, 696 at time instants T1 and T2 respectively. As can be seen, the CMV limit for the seven-level converter at carrier band 674, 676, 678 and are thus equal to the CMV limit for the three-level converter at carrier band 616. Therefore, the same three-level CMV limit can be applied to the seven-level converter. Similarly, the three-level CMV limit can be applied for an n-level converter to determine the common mode voltage for injection.

Further referring to FIGS. 10-12, in some embodiments, applying the three-level CMV limit to three-phase voltage commands at any instant may generate three different maximum CMV limits and three different minimum CMV limits. In this case, the maximum CMV limit 524 may be the one that is a minimum of the three different maximum CMV limits, and the minimum CMV limit 526 is the one that is a maximum of the three different minimum CMV limits. It can be understood that using the three-level CMV limit to represent the maximum and minimum CMV limits for an n-level converter can avoid complexity in computations for controlling the switching of the power converters.

Figure 13:
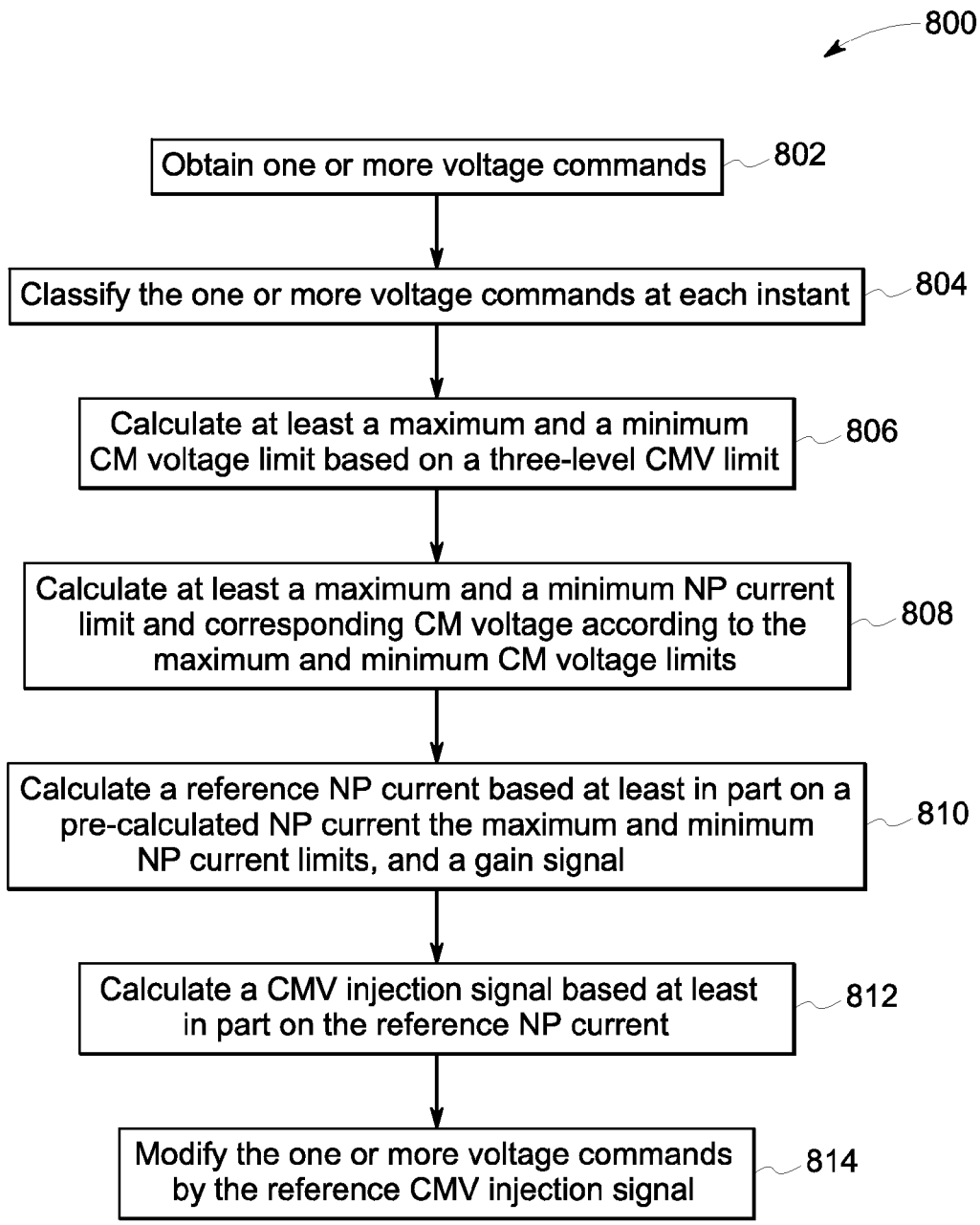
FIG. 13 is a flowchart illustrating a unified common mode voltage injection method in accordance with one exemplary embodiment of the present disclosure.

FIG. 13 is a flowchart illustrating a common mode voltage injection method 800 in accordance with one exemplary embodiment of the present disclosure. The CMV injection method 800 may be independently implemented by the second CMV injection module 404 shown in FIGS. 8-9 to achieve at least one function of balancing DC voltage present at a DC link of the power conversion system 100. The common mode voltage injection method 800 may also be implemented in combination with the first CMV injection module 402 to achieve multiple functions in association with the operation of the power conversion system 100. At least some of the blocks/actions illustrated in method 800 may be programmed with software instructions stored in a computer-readable storage medium. The computer-readable storage medium may include volatile and nonvolatile, removable and non-removable media implemented in any method or technology. The computer-readable storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by one or more processors.

In one embodiment, the method 800 may include a block 802, in which one or more voltage commands such as three-phase AC voltage commands are obtained. In one embodiment, the one or more voltage commands or the three-phase AC voltage commands may be obtained from one or more upper level controllers by implementing one or more algorithms to achieve a desired AC voltage at the output of the power converter. In one embodiment, the one or more voltage commands may be signals that are free of CMV injection. In other embodiments, the one or more voltage commands may have already been modified by a first CMV signal which may be generated through min-max calculation or has pure third-order harmonic signal as described above with reference to FIG. 8.

At block 804, the method 800 continues to classify the obtained one or more voltage commands. For example, a min-max classifier 506 (see FIG. 11) may be used to identify at least a maximum value and a minimum value from the one or more voltage commands at each instantaneous time. In some embodiments, a medium voltage may also be identified using the min-max classifier 506.

At block 806, the method 800 continues to calculate a maximum CM voltage limit and a minimum CM voltage limit based at least in part on the instantaneous maximum and minimum voltage commands using a three-level CMV limit. At block 808, the method 800 continues to calculate NP current signals after CMV injection based on the maximum CMV limit and the minimum CMV limits. The calculation of the NP current signals can be done in analytical manner. In one embodiment, the calculation of the NP current signals are based on all characteristic points in the non-linear relationship between the NP current and the common mode voltage including the maximum and minimum CMV limits.

At block 810, the method 800 continues to calculate a reference NP current based at least in part on a pre-calculated NP current, the maximum and minimum NP current limits, and a gain signal. In some embodiments, the gain signal is generated by a DC link voltage balance controller by regulating input signals representing voltage difference between at least two DC capacitors of the DC link.

At block 812, the method 800 continues to calculate a CMV injection signal based at least in part on the calculated reference NP current. In one embodiment, a reverse function such as one or more linear functions of the CM voltage in terms of NP current can be derived for calculation of the CMV injection signals. At block 814, the one or more voltage commands obtained at block 802 is modified by combining the reference CMV injection signal with the one or more voltage commands. In some embodiments, the modified one or more voltage commands are supplied to a modulator for generating control signals used to turn on and/or off the various switching devices in the power converter. Therefore, the voltage difference at the DC link can be minimized by injecting the CMV signals to the one or more voltage commands or modulation signals.

The method 800 described above with reference to FIG. 13 may be modified in a variety of ways. For example, in some embodiments, the method 800 may include additional one or more blocks/actions. For example, the method 800 may include blocks for obtaining one or more current commands which are used to calculate the original NP current at the neutral point of the DC link. The method 800 may also include blocks for identifying at least an instantaneous current at maximum voltage and an instantaneous current at minimum voltage from one or more current commands.

While the invention has been described with reference to exemplary embodiments, it will be understood by those skilled in the art that various changes may be made and equivalents may be substituted for elements thereof without departing from the scope of the invention. Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A power conversion system, comprising: at least one multi-level power converter; a controller coupled to the at least one multi-level power converter, the controller comprising: a first common mode voltage (CMV) injection module for generating a first CMV signal for modifying at least one voltage command to achieve a first function in association with operation of the power conversion system; a second CMV injection module for generating a second CMV signal based at least in part on a three-level CMV limit for further modifying the at least one modified voltage command to achieve a second function in association with operation of the power conversion system; wherein the second CMV injection module comprises: a min-max classifier for determining an instantaneous maximum voltage, an instantaneous medium voltage and an instantaneous minimum voltage from three- phase AC voltage command signals; a CMV limit calculator for calculating a maximum CMV limit and a minimum CMV limit based on instantaneous maximum voltage, the instantaneous medium voltage, the instantaneous minimum voltage and the three-level CMV limit; wherein modifying the at least one voltage command includes adding the first CMV signal into the at least one voltage command; and wherein the first CMV signal is generated based at least in part on the instantaneous maximum voltage and the instantaneous minimum voltage.

2. The power conversion system of claim 1, further comprising a direct current (DC) link coupled to the at least one multi-level converter, the DC link comprising at least two DC capacitors defining at least one DC neutral point therebetween, wherein the second CMV signal is used to modify the at least one voltage command to regulate the DC current component flowing from or to the DC neutral point of the DC link in order to reduce the voltage difference between two the DC capacitors substantially to zero.

3. The power conversion system of claim 2, wherein the second CMV signal is further used to modify the at least one voltage command to regulate the AC current component flowing from or to the DC neutral point of the DC link in order to substantially reduce the voltage difference between the two capacitors to zero.

4. The power conversion system of claim 1, wherein the CMV limit calculator computes the maximum CMV limit and the minimum CMV limit based at least in part on a minimum pulse width requirement of a pulse width modulator (PWM).

5. The power conversion system of claim 1, wherein the second CMV injection module further comprises a NP current calculator for calculating a maximum neutral point current, a minimum neutral point current, a first CMV corresponding to the maximum neutral point current, and a second CMV corresponding to the minimum neutral point current based at least in part on a maximum CMV limit, a minimum CMV limit, and a three-phase AC current command.

6. The power conversion system of claim 1, wherein the second CMV injection module further comprises a reference NP current calculator for calculating a neutral point reference current based at least in part on a maximum neutral point current, a minimum neutral point current, a pre-calculated neutral point current with zero CMV injection from the second CMV signal and a gain signal generated from regulation of a DC voltage difference at the DC link.

7. The power conversion system of claim 1, wherein the second CMV injection module further comprises an inverse function calculator for calculating the second CMV signal based at least in part on a maximum neutral point current, a minimum neutral point current, the first CMV corresponding to the maximum neutral point current, the second CMV corresponding to the minimum neutral point current, and a neutral point reference current.

8. The power conversion system of claim 1, wherein the second CMV injection module further comprises a DC voltage balance regulator for generating a gain signal based at least in part on a DC voltage difference signal at the DC link.

9. The power conversion system of claim 1, wherein the second CMV injection module further comprises a NP current pre-calculator for calculating an original neutral point current flowing from or to the DC neutral point based at least in part on the instantaneous maximum, medium, and minimum voltage signals, an instantaneous current signals corresponding to the maximum, medium, and minimum voltage signals, and wherein the original neutral point current is used for generating a neutral point reference current.

10. The power conversion system of claim 1, wherein the first function includes increasing a direct current (DC) voltage utilization or reducing a total harmonic distortion at the output of the at least one multi-level power converter.

11. The power conversion system of claim 1, wherein the first CMV signal ($u_0$) given by:

$$u_0 = \frac{\max(u_{dm,a,b,c}) + \min(u_{dm,a,b,c})}{2}$$

where $\max(u_{dm,a,b,c})$ represents the instantaneous maximum voltage and $\min(u_{dm,a,b,c})$ represents the instantaneous minimum voltage.

12. A method for operating a power conversion system having a multi-level converter and a controller coupled thereto, the method comprising: generating a first common mode voltage (CMV) injection signal; using the first CMV injection signal to modify at least one voltage command to achieve a first function in association with operation of the power conversion system; generating a second CMV signal based at least in part on a three-level CMV limit; using the second CMV signal to further modify the at least one modified voltage command to achieve a second control function in association with operation of the power conversion system; wherein the at least one voltage command is modified by adding the first CMV signal into the at least one voltage command; wherein generating the second CMV signal comprises: determining an instantaneous maximum voltage, an instantaneous medium voltage and an instantaneous minimum voltage from three-phase AC voltage command signals; calculating a maximum CMV limit and a minimum CMV limit based on the instantaneous maximum voltage, the instantaneous medium voltage, the instantaneous minimum voltage and the three-level CMV limit; and wherein the first CMV signal is generated based at least in part on the instantaneous maximum voltage and the instantaneous minimum voltage.

13. The method of claim 12, wherein generating the second CMV signal comprises:
calculating a neutral point maximum current, a neutral point minimum current, a first CMV corresponding to the neutral point maximum current, and a second CMV corresponding to the neutral point minimum current based at least in part on the maximum CMV limit, the minimum CMV limit, a plurality of instantaneous current command signals; and
calculating the second CMV signal based at least in part on the neutral point maximum current, the neutral point minimum current, the first CMV corresponding to the neutral point maximum current, the second CMV corresponding to the neutral point minimum current, and a neutral point reference current.

14. The method of claim 12, further comprising:
generating a gain signal based at least in part on a DC voltage difference signal at a DC link; and
calculating the neutral point reference current based at least in part on the maximum neutral point current, minimum neutral point current, the original neutral point current and the gain signal.

15. The method of claim 12, further comprising:
calculating an original neutral point current flowing from or to a DC neutral point based at least in part on the instantaneous maximum, medium, and minimum voltage signals, an instantaneous current signals corresponding to the maximum, medium, and minimum voltage signals; and
generating the neutral point reference current by selectively using the original neutral point current according to at least one desired current pattern present at the neutral point of the DC link.

* * * * *